US012739274B2

(12) United States Patent
Sellars et al.

(10) Patent No.: US 12,739,274 B2
(45) Date of Patent: Sep. 15, 2026

(54) LARGE SCALE SECURITY DATA AGGREGATION, WITH MACHINE LEARNING ANALYSIS AND USE OF THAT SECURITY DATA AGGREGATION

(71) Applicant: Darktrace Holdings Limited, Cambridge (GB)

(72) Inventors: Philip Sellars, Cambridge (GB); Stephen Pickman, Huntington (GB); Andres Curto Martin, Cambridge (GB); Tim Bazalgette, Knebworth (GB); Soufian El Yadmani, The Hague (NL)

(73) Assignee: Darktrace Holdings Limited, Cambridge (GB)

( * ) Notice: Subject to any disclaimer, the term of this patent is extended or adjusted under 35 U.S.C. 154(b) by 91 days.

(21) Appl. No.: 18/400,654

(22) Filed: Dec. 29, 2023

(65) Prior Publication Data

US 2024/0223596 A1 Jul. 4, 2024

Related U.S. Application Data

(60) Provisional application No. 63/470,571, filed on Jun. 2, 2023, provisional application No. 63/436,425, filed on Dec. 30, 2022.

(51) Int. Cl.
*H04L 9/40* (2022.01)

(52) U.S. Cl.
CPC ................................ *H04L 63/1441* (2013.01)

(58) Field of Classification Search
None
See application file for complete search history.

(56) References Cited

U.S. PATENT DOCUMENTS

| | | | |
|---|---|---|---|
| 10,268,821 B2 | 4/2019 | Stockdale | |
| 10,419,466 B2 | 9/2019 | Ferguson | |
| 10,701,093 B2 | 6/2020 | Dean | |
| 11,463,457 B2 * | 10/2022 | Bazalgette | G06N 20/00 |

(Continued)

*Primary Examiner* — Amir Mehrmanesh
*Assistant Examiner* — Hassan Saadoun
(74) *Attorney, Agent, or Firm* — Rutan and Tucker, LLP

(57) ABSTRACT

An apparatus to protect a network from a potential cyber threat associated with a new endpoint to that network is described. The apparatus comprises a memory to store a representation of an artificial intelligence (AI) model. The AI model is at least partly trained based on information aggregated from a first information source and a second information source. The first information source comprises information about a first factor that at least partly characterizes endpoints. The second information source comprises information about a second, different, factor that at least partly characterizes endpoints. The apparatus further comprises a processor. The processor is to receive information about the new endpoint to that network. The processor is further to determine, using the AI model, whether the information about the new endpoint indicates that a characteristic of the new endpoint overlaps with a profile of characteristics associated with endpoints known to be associated with a cyber threat. The processor is further to, in response to determining that the characteristic of the new endpoint overlaps with the profile of characteristics, instruct an action to be taken to protect the network from the cyber threat.

20 Claims, 9 Drawing Sheets

(56) References Cited

U.S. PATENT DOCUMENTS

| | | | | |
|---|---|---|---|---|
| 11,539,716 | B2 | 12/2022 | Meng | |
| 2020/0244673 | A1 | 7/2020 | Stockdale | |
| 2020/0285737 | A1 | 9/2020 | Kraus | |
| 2021/0141897 | A1* | 5/2021 | Seifert | G06F 21/566 |
| 2021/0273958 | A1* | 9/2021 | McLean | H04L 63/1433 |
| 2021/0398109 | A1 | 12/2021 | Huber, Jr. | |
| 2022/0038489 | A1 | 2/2022 | Thakur | |
| 2022/0108238 | A1* | 4/2022 | Liposky | G06N 20/00 |
| 2022/0147607 | A1 | 5/2022 | Streit | |
| 2022/0150275 | A1 | 5/2022 | McNee | |
| 2022/0164697 | A1* | 5/2022 | Subramaniam | G06N 3/045 |
| 2022/0337488 | A1* | 10/2022 | Najman | G06N 5/04 |
| 2022/0414344 | A1 | 12/2022 | Makki Niri | |
| 2023/0063913 | A1 | 3/2023 | Balaji | |
| 2023/0206261 | A1 | 6/2023 | Cella | |
| 2023/0328086 | A1* | 10/2023 | Kapoor | H04L 63/1425 |
| 2024/0106846 | A1* | 3/2024 | Kapoor | H04L 63/10 |

* cited by examiner

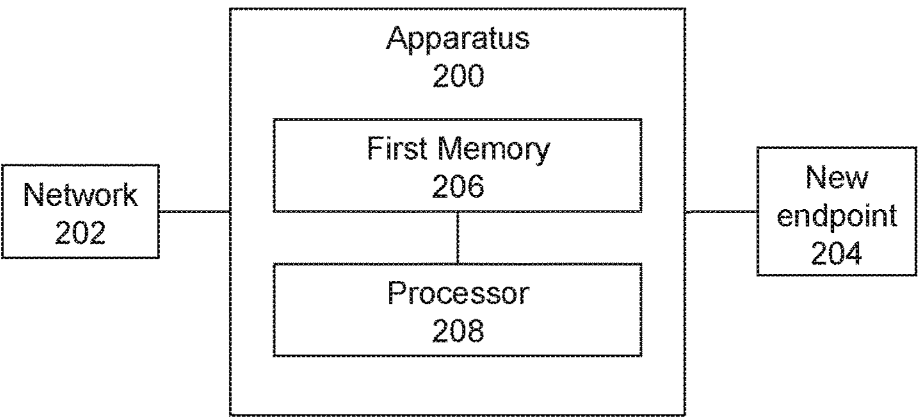
FIG. 2
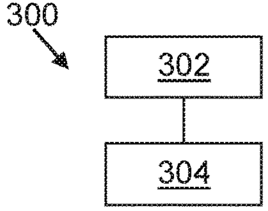
FIG. 3
| Sensor 1 | Sensor 2 | Sensor 3 | Sensor 4 | Sensor 5 | Sensor 6 | Sensor 7 | Sensor 8 | Sensor 9 | Sensor 10 |
|---|---|---|---|---|---|---|---|---|---|
| 100% | 100% | 100% | 100% | 96% | 96% | 93% | 55% | 10% | 0% |
| Number counts with rarity equal to 0% | Number counts with rarity between 1% and 50% | Number counts with rarity between 51% and 99% | Number counts with rarity equal to 100% |
|---|---|---|---|
| 1 | 1 | 4 | 4 |
| New rarity score for example[.]com | 7% |
|---|---|
FIG. 4

LARGE SCALE SECURITY DATA AGGREGATION, WITH MACHINE LEARNING ANALYSIS AND USE OF THAT SECURITY DATA AGGREGATION

NOTICE OF COPYRIGHT

A portion of this disclosure contains material that is subject to copyright protection. The copyright owner has no objection to the facsimile reproduction by anyone of the material subject to copyright protection as it appears in the United States Patent & Trademark Office's patent file or records, but otherwise reserves all copyright rights whatsoever.

RELATED APPLICATION

This application claims priority under 35 USC 119 to U.S. provisional patent application No. 63/436,425, titled "A CYBER SECURITY SYSTEM" filed Dec. 30, 2022, and U.S. provisional patent application No. 63/470,571, titled "A CYBER SECURITY SYSTEM" filed Jun. 2, 2023, which the disclosures of such are incorporated herein by reference in their entirety.

FIELD

Cyber security and in an embodiment use of Artificial Intelligence in cyber security.

BACKGROUND

Cybersecurity attacks have become a pervasive problem for enterprises as many computing devices and other resources have been subjected to attack and compromised. A "cyberattack" constitutes a threat to security of an enterprise (e.g., enterprise network, one or more computing devices connected to the enterprise network, or the like). As an example, the cyberattack may be a cybersecurity threat against the enterprise network, one or more computing devices connected to the enterprise network, stored or in-flight data accessible over the enterprise network, and/or other enterprise-based resources. This security threat may involve malware (malicious software) introduced into a computing device or into the network. The security threat may originate from an external endpoint or an internal entity (e.g., a negligent or rogue authorized user). The security threats may represent malicious or criminal activity, ranging from theft of credential to even a nation-state attack, where the source initiating or causing the security threat is commonly referred to as a "malicious" source. Conventional cybersecurity products are commonly used to detect and prioritize cybersecurity threats (hereinafter, "cyber threats") against the enterprise, and to determine preventive and/or remedial actions for the enterprise in response to those cyber threats.

SUMMARY

Methods, systems, and apparatus are disclosed for an Artificial Intelligence-based cyber security system. The Artificial Intelligence based cyber security system can include features including (what can be termed) deep space inoculation as a threat sharing intelligence product from multiple different sources that each can look at different factors of an endpoint, and other features.

In an aspect, an apparatus to protect a network from a potential cyber threat associated with a new endpoint to that network is described. The apparatus comprises a memory to store a representation of an artificial intelligence (AI) model. The AI model is at least partly trained based on information aggregated from a first information source and a second information source. The first information source comprises information about a first factor that at least partly characterizes endpoints. The second information source comprises information about a second, different, factor that at least partly characterizes endpoints. The apparatus further comprises a processor. The processor is to receive information about the new endpoint to that network. The processor is further to determine, using the AI model, whether the information about the new endpoint indicates that a characteristic of the new endpoint overlaps with a profile of characteristics associated with endpoints known to be associated with a cyber threat. The processor is further to, in response to determining that the characteristic of the new endpoint overlaps with the profile of characteristics, instruct an action to be taken to protect the network from the cyber threat.

In another aspect, a non-transitory computer readable medium is described. The non-transitory computer readable medium stores instructions readable and executable by a processor. The instructions are to cause the processor to determine, using an artificial intelligence (AI) model, whether information about a new endpoint to a network indicates that a characteristic of the new endpoint overlaps with a profile of characteristics associated with endpoints known to be associated with a cyber threat. The AI model is at least partly trained based on information aggregated from a first information source and a second information source. The first information source comprises information about a first factor that at least partly characterizes endpoints. The second information source comprises information about a second, different, factor that at least partly characterizes endpoints. The instructions are further to cause the processor to, in response to determining that the characteristic of the new endpoint overlaps with the profile of characteristics, instruct an action to be taken to protect the network from the cyber threat.

In another aspect, a computer-implemented method of protecting a network from a potential cyber threat associated with a new endpoint to the network is described. The method comprises determining, using an artificial intelligence (AI) model, whether information about the new endpoint indicates that a characteristic of the new endpoint overlaps with a profile of characteristics associated with endpoints known to be associated with a cyber threat. The AI model is at least partly trained based on information aggregated from a first information source and a second information source. The first information source comprises information about a first factor that at least partly characterizes endpoints. The second information source comprises information about a second, different, factor that at least partly characterizes endpoints. The method further comprises, in response to determining that the characteristic of the new endpoint overlaps with the profile of characteristics, instructing an action to be taken to protect the network from the cyber threat.

In another aspect, a computer-implemented method of training an artificial intelligence (AI) model for use in protecting a network from a potential cyber threat is described. The method comprises accessing information aggregated from a first information source and a second information source. The first information source comprises information about a first factor that at least partly characterizes endpoints. The second information source comprises information about a second, different, factor that at least partly characterizes endpoints. The method further comprises training an AI model, using the information aggregated from the first information source and the second information source, to determine whether information about a new endpoint to the network indicates that a characteristic of the new endpoint overlaps with a profile of characteristics associated with endpoints known to be associated with a cyber threat.

These and other features of the design provided herein can be better understood with reference to the drawings, description, and claims, all of which form the disclosure of this patent application.

DRAWINGS

The drawings refer to some embodiments of the design provided herein in which:

FIG. 2 illustrates a block diagram of an embodiment of an apparatus to protect a network from a potential cyber threat associated with a new endpoint.

FIG. 3 refers to a flowchart of an embodiment of a method of protecting a network from a potential cyber threat associated with a new endpoint.

FIG. 4 illustrates a table of data indicative of a rarity score of a particular hostname determined by multiple detectors.

Figure 5:
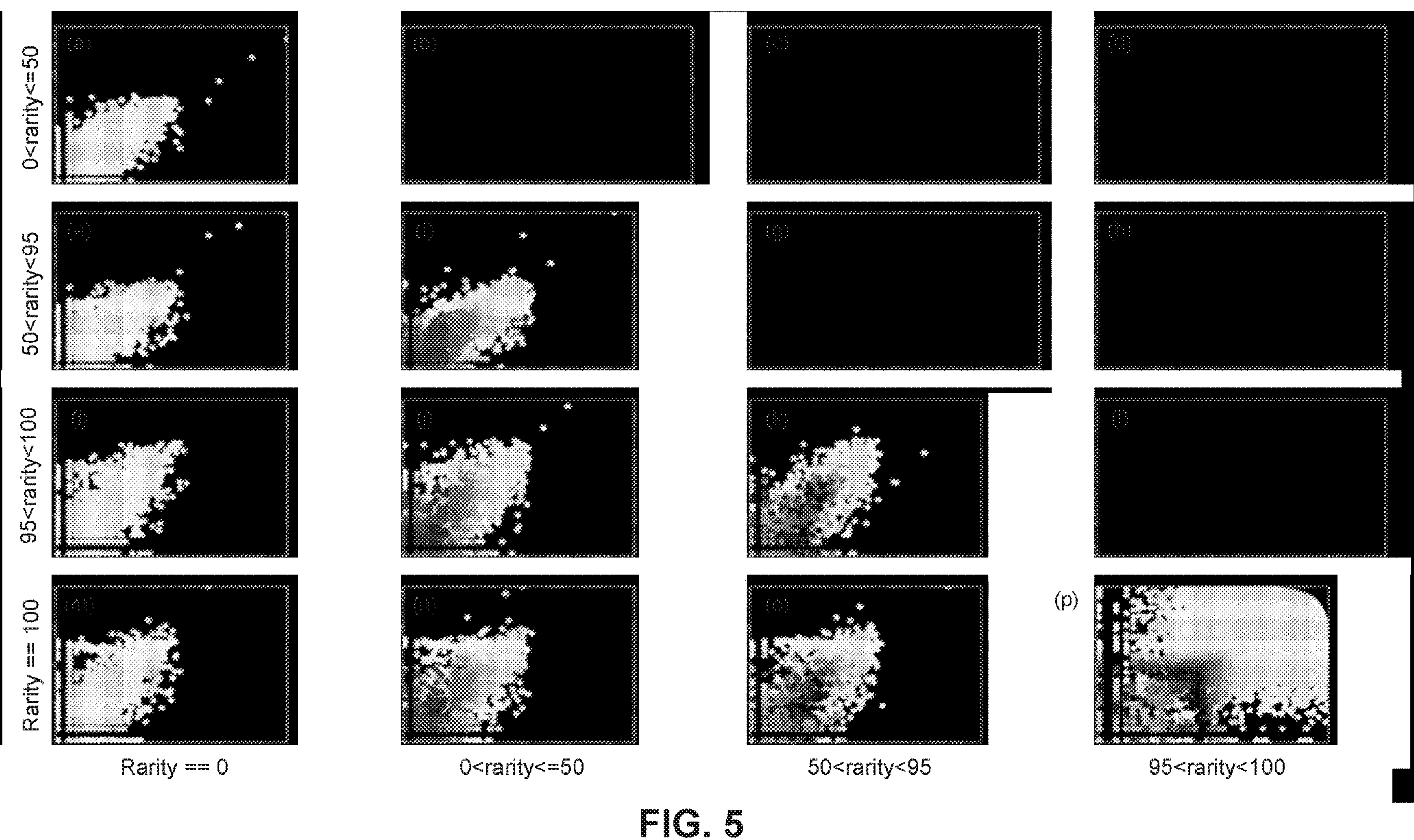

FIG. 5 refers to a set of graphs indicating different intervals of rarity scores detected by different sensors for a selection of hostnames.

Figure 6:
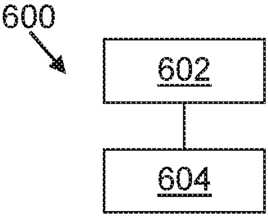

FIG. 6 refers to a flowchart of an embodiment of a method of training an AI model for use in protecting a network from a potential cyber threat associated with a new endpoint.

Figure 7:
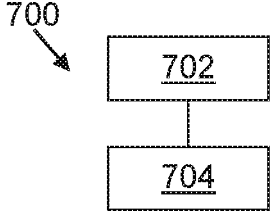

FIG. 7 refers to a flowchart of an embodiment of a method involved in the training of an AI model for use in protecting a network from a potential cyber threat associated with a new endpoint.

Figure 8:
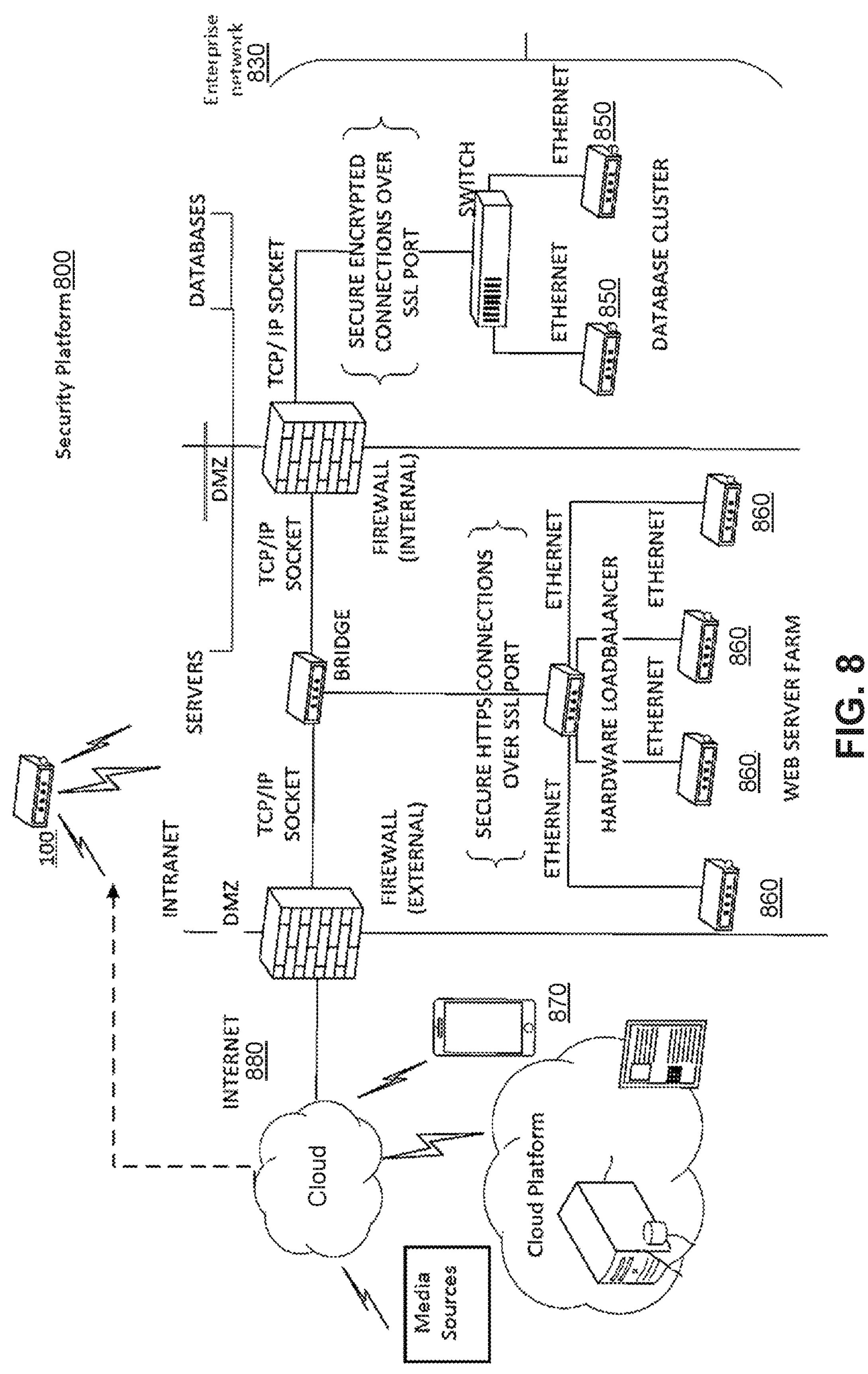

FIG. 8 illustrates a block diagram of an embodiment of a security platform including the AI-based cyber security appliance.

Figure 9:
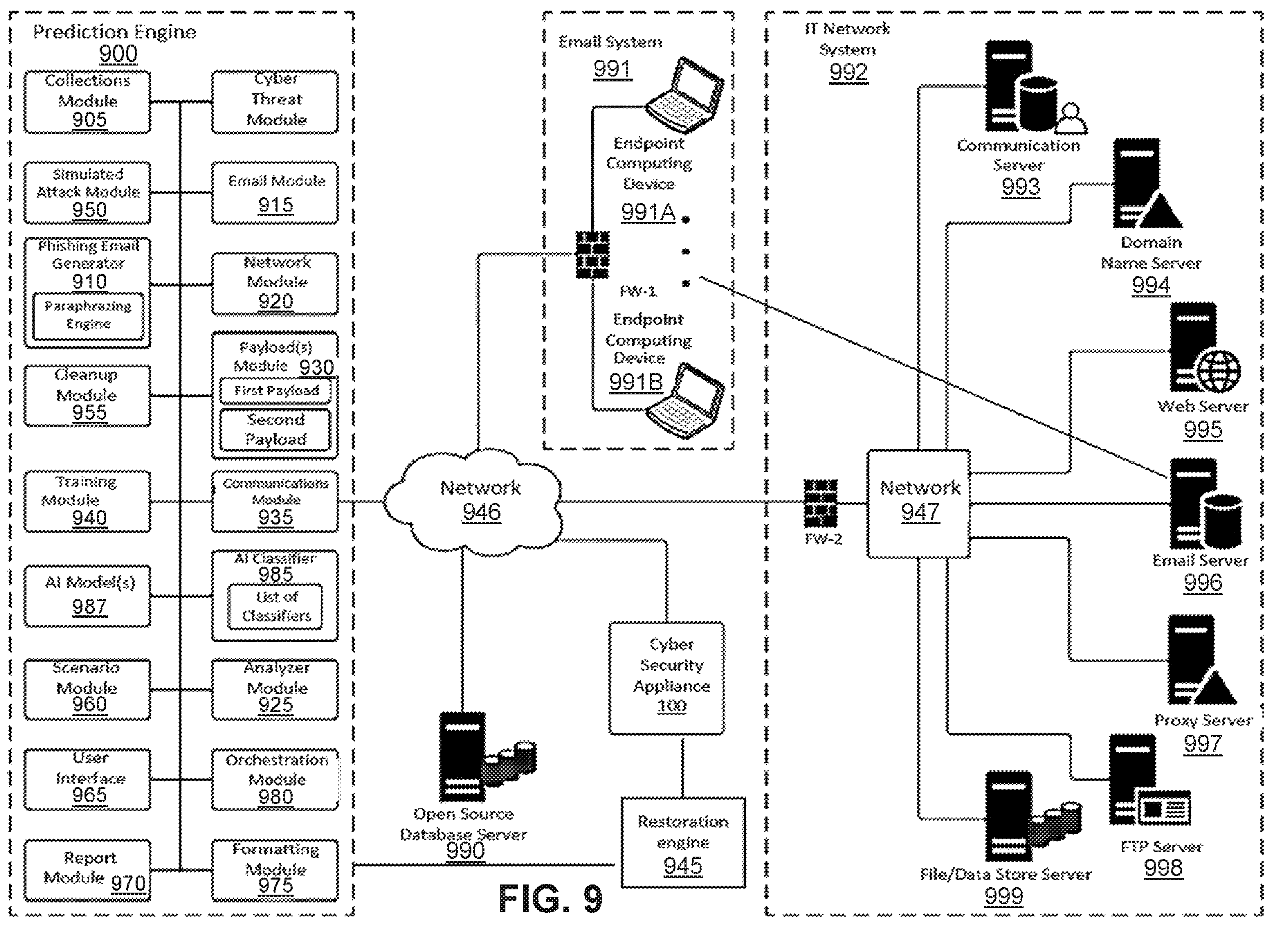

FIG. 9 illustrates a block diagram of an embodiment of an AI-based cyber security system including a prediction engine.

Figure 10:
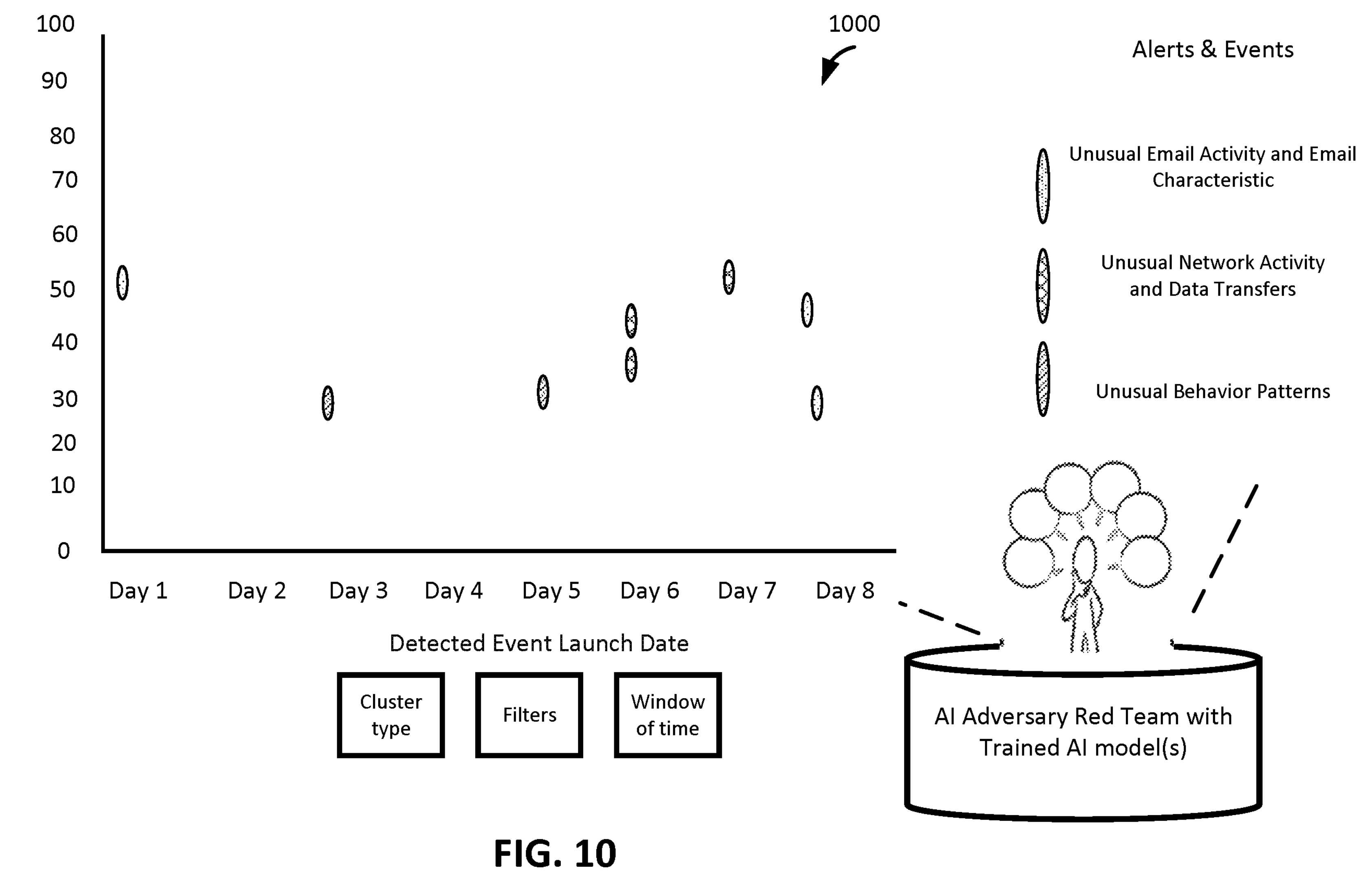

FIG. 10 illustrates a graph of an embodiment of an example chain of unusual behavior for, in this example, the email activities and IT network activities deviating from a normal pattern of life in connection with the rest of the system/network under analysis.

Figure 11:
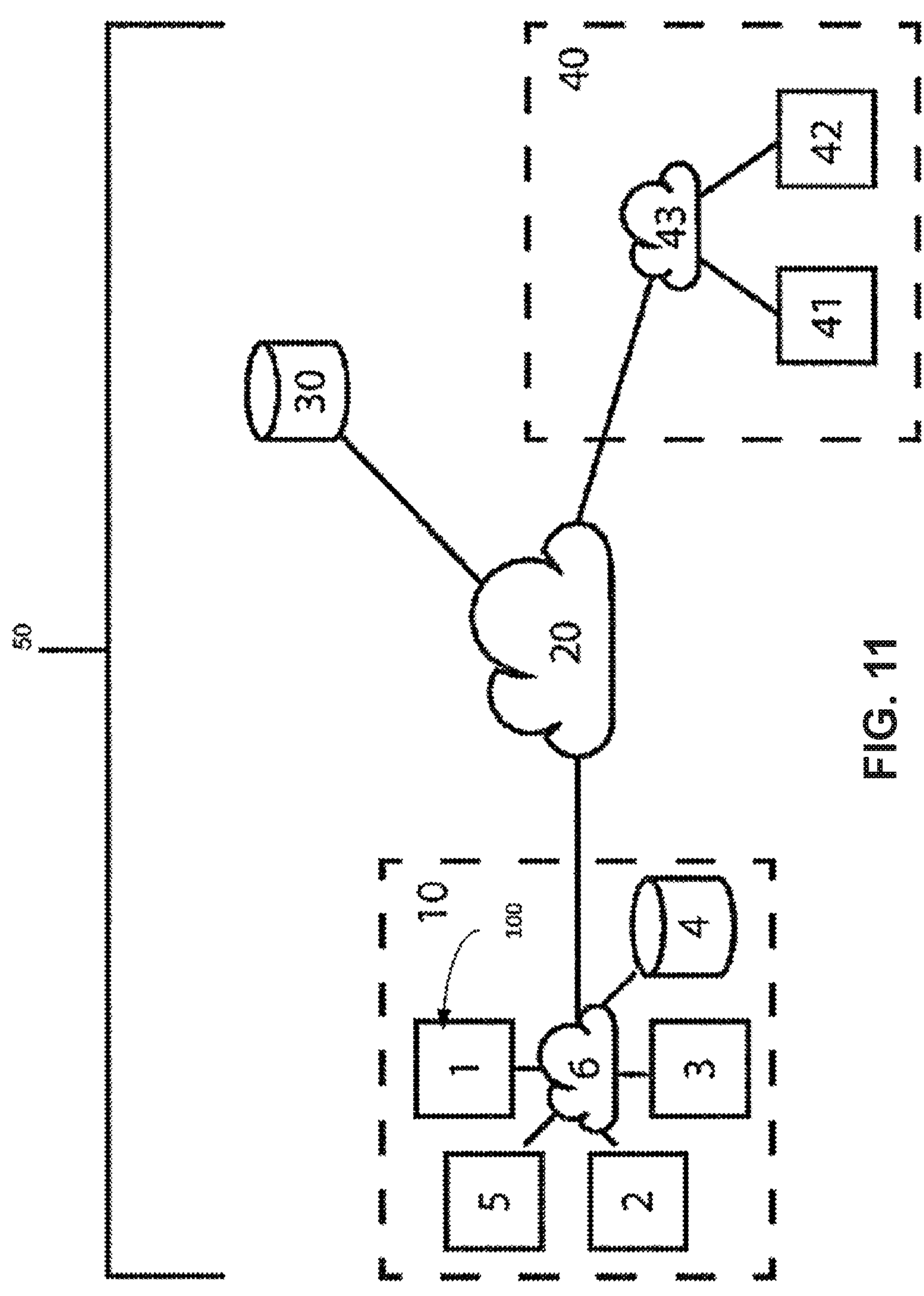

FIG. 11 illustrates a block diagram of an embodiment of the cyber security restoration engine cooperating with the other Artificial Intelligence-based engines of in a cyber security appliance to track and understand the cyber threat identified by the other Artificial Intelligence-based engines as well as track the one or more mitigation actions taken to mitigate the cyber threat during the cyberattack by the other Artificial Intelligence-based engines in order to assist in intelligently restoring the protected system, while still mitigating the cyber threat attack, back to a trusted operational state.

Figure 12:
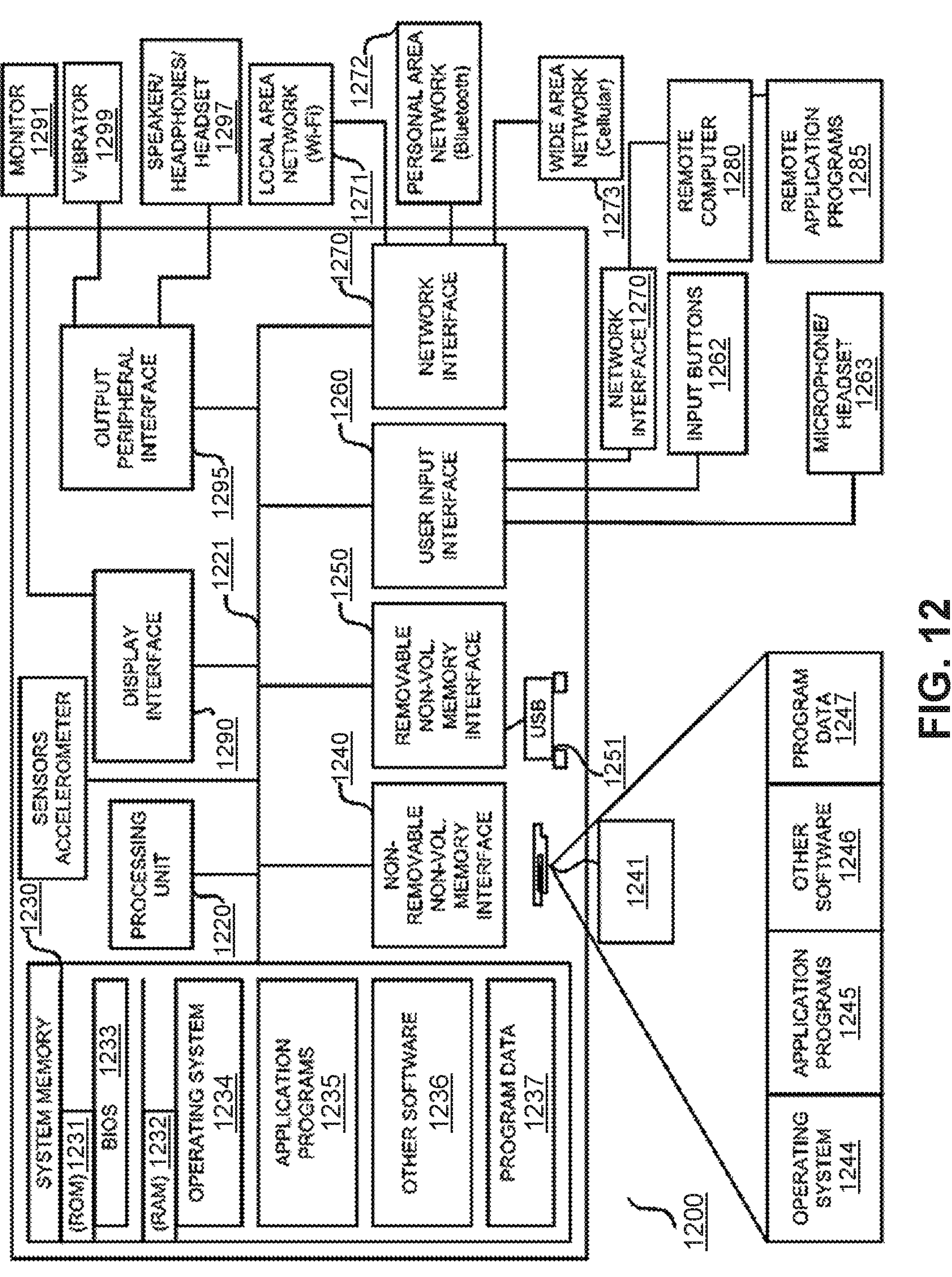

FIG. 12 illustrates a block diagram of an embodiment of one or more computing devices that can be a part of an AI-based, cyber security system.

While the design is subject to various modifications, equivalents, and alternative forms, specific embodiments thereof have been shown by way of example in the drawings and will now be described in detail. It should be understood that the design is not limited to the particular embodiments disclosed, but—on the contrary—the intention is to cover all modifications, equivalents, and alternative forms using the specific embodiments.

DESCRIPTION

In the following description, numerous specific details are set forth, such as examples of specific data signals, named components, number of servers in a system, etc., in order to provide a thorough understanding of the present design. It will be apparent, however, to one of ordinary skill in the art that the present design can be practiced without these specific details. In other instances, well known components or methods have not been described in detail but rather in a block diagram in order to avoid unnecessarily obscuring the present design. Further, specific numeric references such as a first server, can be made. However, the specific numeric reference should not be interpreted as a literal sequential order but rather interpreted that the first server is different than a second server. Thus, the specific details set forth are merely exemplary.

Also, the features implemented in one embodiment may be implemented in another embodiment where logically possible.

The specific details can be varied from and still be contemplated to be within the spirit and scope of the present design.

The present disclosure relates to apparatus, computer readable media, and methods of protecting a network from a potential cyber threat, where such apparatus, computer readable media, and methods involve use of an artificial intelligence (AI). The present disclosure further relates to methods of training an AI model for use in protecting a network from a potential cyber threat. Such methods of training may also be implemented by apparatus and computer readable media. In some embodiments, a new endpoint may be detected where that endpoint represents a potential cyber threat.

As used herein, a network may refer to a computing network that is to be protected from a potential cyber threat. The network may comprise a computing device (such as a user computing device, server, node, or any other type of computing device) that is capable of communicating with an endpoint accessible from the network (e.g., via the internet or another type of public network).

An endpoint may refer to a point of connection for an application (such as provided by a service or other tool) accessible to the network (e.g., via the internet). Such a point of connection may include a server, a virtualized computing service e.g., based on a cloud service, or any other computing device capable of transmitting and/or receiving data to/from a computing device in the network. In some cases, data communicated between the endpoint and the network may be communicated via computing infrastructure such as the internet.

A network may be operated by an organization such as an enterprise, school, government department, or any other type of organization that might have a need to protect its network from a potential cyber threat. For example, the network may be a private network operated by the organization. A computing device within the network (e.g., a computing device operated by a human) may seek to communicate with an endpoint (such as indicated by a Uniform Resource Locator (URL) sent via email to the user) such as by transmitting and/or receiving data to/from the endpoint. In some cases, the endpoint is malicious, or at least may represent a potential cyber threat, in which case an appropriate action may be taken to reduce or eliminate the threat. In some other cases, the endpoint is considered to be relatively safe, or at least unlikely to represent a potential cyber threat.

A new endpoint may refer to an unknown (e.g., a novel or unclassified) endpoint that is to communicate with the network. Endpoints may either be known or unknown. For example, knowledge about the endpoint such its identity and a classification as to whether the endpoint is safe or malicious may be known or unknown to a service, tool, or person concerned with cyber threats. Such knowledge may be held in a database or other repository and shared with various organizations for the purpose of keeping up to date with the latest cyber threats posed by known endpoints. Communications with known endpoints may be controlled as described herein (e.g., allowed, stopped, or restricted in some way) according to whether the endpoint is deemed to be safe or malicious. However, unknown endpoints that have not yet been classified as being safe or malicious (or some other classification) present challenges for cyber threat detection and mitigation.

Accordingly, certain embodiments and cases described herein may help in protecting a network from a potential cyber threat represented by a new endpoint. This concept is introduced in more detail in the section on information aggregation.

Cyber Security Appliance

Figure 1:
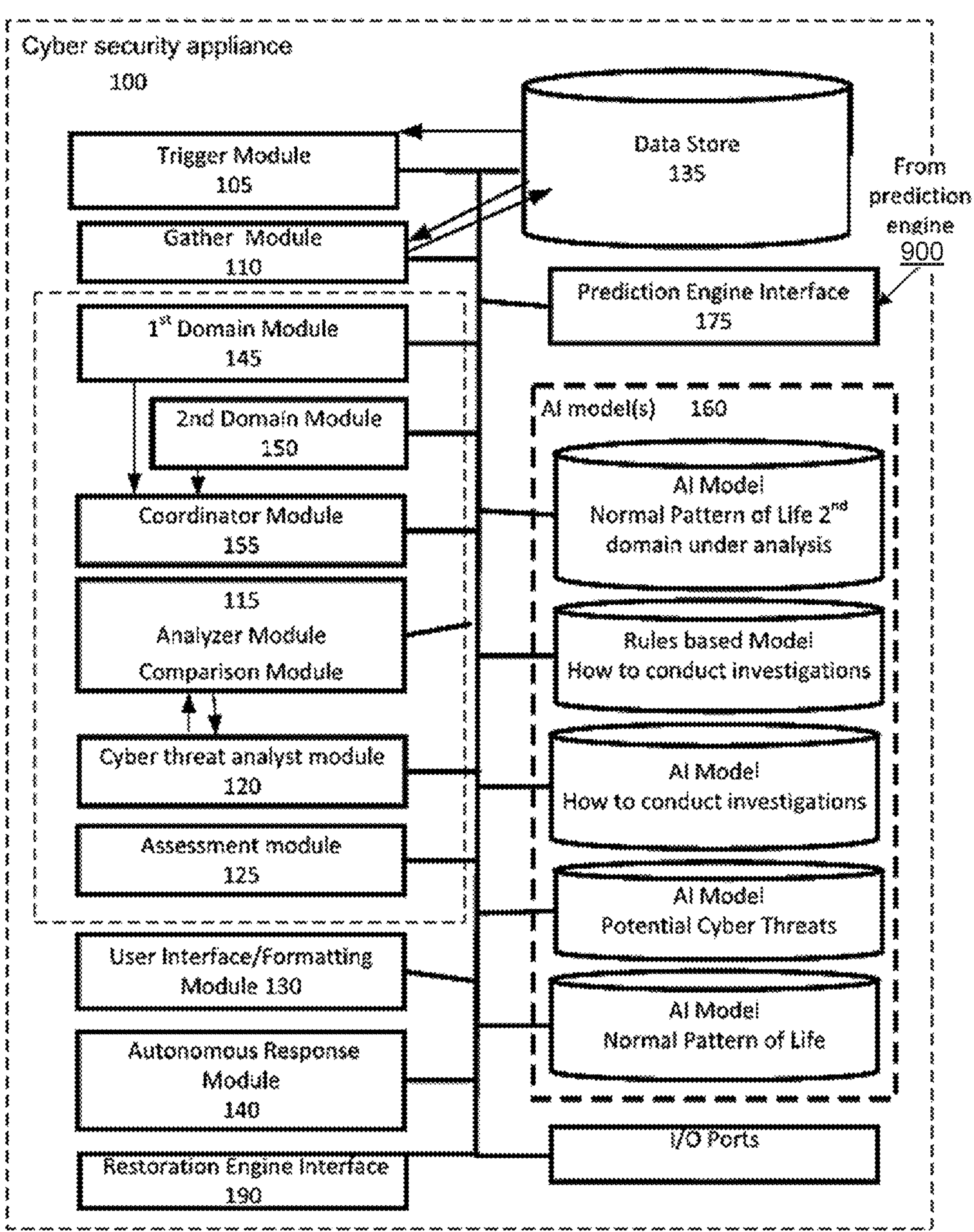
FIG. 1 illustrates a block diagram of an embodiment of the AI-based cyber security appliance with example components making up a detection engine that protects a system, including but not limited to a network/domain, from cyber threats.

FIG. 1 illustrates a block diagram of an embodiment of the AI-based cyber security appliance 100 with example components making up a detection engine that protects a system, including but not limited to a network/domain, from cyber threats. Various Artificial Intelligence models and modules of the cyber security appliance 100 cooperate to protect a system, such as one or more networks/domains under analysis, from cyber threats. As shown, according to one embodiment of the disclosure, the AI-based cyber security appliance 100 may include a trigger module 105, a gather module 110, an analyzer module 115, a cyber threat analyst module 120, an assessment module 125, a formatting module 130, a data store 135, an autonomous response module 140, a first ($1^{st}$) domain module 145, a second ($2^{nd}$) domain module 150, and a coordinator module 155, one or more AI models 160 (hereinafter, AI model(s)"), and/or other modules. The AI model(s) 160 may be trained with machine learning on a normal pattern of life for entities in the network(s)/domain(s) under analysis, with machine learning on cyber threat hypotheses to form and investigate a cyber threat hypothesis on what are a possible set of cyber threats and their characteristics, symptoms, remediations, etc., and/or trained on possible cyber threats including their characteristics and symptoms, a data store, an interface to an autonomous response engine, an interface 190 to a restoration engine, an interface 175 to a prediction engine, a 1st domain module, a 2nd domain module, and a coordinator module, and other similar components.

The cyber threat detection engine includes a set of modules cooperating with one or more Artificial Intelligence models configured to perform a machine-learned task of detecting a cyber threat incident. The detection engine uses the set of modules cooperating with the one or more Artificial Intelligence models to detect anomalous behavior of one or more nodes, including at least user accounts, devices, and versions of source code files, in a graph of a system being protected. The detection engine uses the set of modules cooperating with the one or more Artificial Intelligence models to prevent a cyber threat from compromising the nodes and/or spreading through the nodes of the system.

The cyber security appliance 100 with the Artificial Intelligence (AI)-based cyber security system may protect a network/domain from a cyber threat (insider attack, malicious files, malicious emails, etc.). In an embodiment, the cyber security appliance 100 can protect all of the devices on the network(s)/domain(s) being monitored by monitoring domain activity including communications). For example, a network domain module (e.g., first domain module 145) may communicate with network sensors to monitor network traffic going to and from the computing devices on the network as well as receive secure communications from software agents embedded in host computing devices/containers. The steps below will detail the activities and functions of several of the components in the cyber security appliance 100.

The gather module 110 may be configured with one or more process identifier classifiers. Each process identifier classifier may be configured to identify and track one or more processes and/or devices in the network, under analysis, making communication connections. The data store 135 cooperates with the process identifier classifier to collect and maintain historical data of processes and their connections, which is updated over time as the network is in operation. Individual processes may be present in merely one or more domains being monitored. In an example, the process identifier classifier can identify each process running on a given device along with its endpoint connections, which are stored in the data store 135. In addition, a feature classifier can examine and determine features in the data being analyzed into different categories. Similarly, data from any of the domains under analysis may be collected and compared.

The gather module 110 can cooperate with the data store 135. The data store 135 may store comprehensive logs for network traffic observed. These logs can be filtered with complex logical queries and each IP packet can be interrogated on a vast number of metrics in the network information stored in the data store. Similarly, other domain's communications and data, such as emails, logs, etc. may be collected and stored in the data store 135. The gather module 110 may comprise multiple automatic data gatherers that each look at different aspects of the data depending on the particular hypothesis formed for the analyzed event. The data relevant to each type of possible hypothesis can be automatically pulled from additional external and internal sources. Some data may be pulled or retrieved by the gather module 110 for each possible hypothesis.

The data store 135 can store the metrics and previous threat alerts associated with network traffic for a period of time, which may be, by default, at least 27 days. This corpus of data may be fully searchable. The cyber security appliance 100 may work with network probes to monitor network traffic and store and record the data and metadata associated with the network traffic in the data store.

The analyzer module 115 can cooperate with the AI model(s) 160 or other modules in the cyber security appliance 100 to confirm a presence of a cyberattack against one or more domains in an enterprise's system (e.g., see system/enterprise network 50 of FIG. 10). A process identifier in the analyzer module 115 can cooperate with the gather module 110 to collect any additional data and metrics to support a possible cyber threat hypothesis. Similarly, the cyber threat analyst module 120 can cooperate with the internal data sources as well as external data sources to collect data in its investigation. More specifically, the cyber threat analyst module 120 can cooperate with the other modules and the AI model(s) 160 in the cyber security appliance 100 to conduct a long-term investigation and/or a more in-depth investigation of potential and emerging cyber threats directed to one or more domains in an enterprise's system. Herein, the cyber threat analyst module 120 and/or the analyzer module 115 can also monitor for other anomalies, such as model breaches, including, for example, deviations for a normal behavior of an entity, and other techniques discussed herein. As an illustrative example, the analyzer module 115 and/or the cyber threat analyst module 120 can cooperate with the AI model(s) 160 trained on potential cyber threats in order to assist in examining and factoring these additional data points that have occurred over a given timeframe to see if a correlation exists between 1) a series of two or more anomalies occurring within that time frame and 2) possible known and unknown cyber threats. The cyber threat analyst module can cooperate with the internal data sources as well as external data sources to collect data in its investigation.

According to one embodiment of the disclosure, the cyber threat analyst module 120 allows two levels of investigations of a cyber threat that may suggest a potential impending cyberattack. In a first level of investigation, the analyzer module 115 and AI model(s) 160 can rapidly detect and then the autonomous response module 140 will autonomously respond to overt and obvious cyberattacks. However, thousands to millions of low level anomalies occur in a domain under analysis all of the time; and thus, most other systems need to set the threshold of trying to detect a cyberattack by a cyber threat at level higher than the low level anomalies examined by the cyber threat analyst module 120 just to not have too many false positive indications of a cyberattack when one is not actually occurring, as well as to not overwhelm a human cyber security analyst receiving the alerts with so many notifications of low level anomalies that they just start tuning out those alerts. However, advanced persistent threats attempt to avoid detection by making these low-level anomalies in the system over time during their cyberattack before making their final coup de grace/ultimate mortal blow against the system (e.g., domain) being protected. The cyber threat analyst module 120 also conducts a second level of investigation over time with the assistance of the AI model(s) 160 trained with machine learning on how to form cyber threat hypotheses and how to conduct investigations for a cyber threat hypothesis that can detect these advanced persistent cyber threats actively trying to avoid detection by looking at one or more of these low-level anomalies as a part of a chain of linked information.

Note, a data analysis process can be algorithms/scripts written by humans to perform their function discussed herein; and can in various cases use AI classifiers as part of their operation. The cyber threat analyst module 120 forms in conjunction with the AI model(s) 160 trained with machine learning on how to form cyber threat hypotheses and how to conduct investigations for a cyber threat hypothesis investigate hypotheses on what are a possible set of cyber threats. The cyber threat analyst module 120 can also cooperate with the analyzer module 115 with its one or more data analysis processes to conduct an investigation on a possible set of cyber threats hypotheses that would include an anomaly of at least one of i) the abnormal behavior, ii) the suspicious activity, and iii) any combination of both, identified through cooperation with, for example, the AI model(s) 160 trained with machine learning on the normal pattern of life of entities in the system. For example, as shown in FIG. 10, the cyber threat analyst module 120 may perform several additional rounds of gathering additional information, including abnormal behavior, over a period of time, in this example, examining data over a 7-day period to determine causal links between the information. The cyber threat analyst module 120 may submit to check and recheck various combinations/a chain of potentially related information, including abnormal behavior of a device/user account under analysis for example, until each of the one or more hypotheses on potential cyber threats are one of 1) refuted, 2) supported, or 3) included in a report that includes details of activities assessed to be relevant activities to the anomaly of interest to the user and that also conveys at least this particular hypothesis was neither supported or refuted. For this embodiment, a human cyber security analyst is needed to further investigate the anomaly (and/or anomalies) of interest included in the chain of potentially related information.

Returning back to FIG. 1, an input from the cyber threat analyst module 120 of a supported hypothesis of a potential cyber threat will trigger the analyzer module 115 to compare, confirm, and send a signal to act upon and mitigate that cyber threat. In contrast, the cyber threat analyst module 120 investigates subtle indicators and/or initially seemingly isolated unusual or suspicious activity such as a worker is logging in after their normal working hours or a simple system misconfiguration has occurred. Most of the investigations conducted by the cyber threat analyst module 120 cooperating with the AI model(s) 160 trained with machine learning on how to form cyber threat hypotheses and how to conduct investigations for a cyber threat hypothesis on unusual or suspicious activities/behavior may not result in a cyber threat hypothesis that is supported but rather most are refuted or simply not supported. Typically, during the investigations, several rounds of data gathering to support or refute the long list of potential cyber threat hypotheses formed by the cyber threat analyst module 120 will occur before the algorithms in the cyber threat analyst module 120 will determine whether a particular cyber threat hypothesis is supported, refuted, or needs further investigation by a human. The rounds of data gathering may build chains of linked low-level indicators of unusual activity along with potential activities that could be within a normal pattern of life for that entity to evaluate the whole chain of activities to support or refute each potential cyber threat hypothesis formed. (See again, for example, FIG. 10 and a chain of linked low-level indicators, including abnormal behavior compared to the normal patten of life for that entity, all under a score of 50 on a threat indicator score). The investigations by the cyber threat analyst module 120 can happen over a relatively long period of time and be far more in depth than the analyzer module 115 which will work with the other modules and AI model(s) 160 to confirm that a cyber threat has in fact been detected.

The gather module 110 may further extract data from the data store 135 at the request of the cyber threat analyst module 120 and/or analyzer module 115 on each possible hypothetical threat that would include the abnormal behavior or suspicious activity and then can assist to filter that collection of data down to relevant points of data to either 1) support or 2) refute each particular hypothesis of what the cyber threat, the suspicious activity and/or abnormal behavior relates to. The gather module 110 cooperates with the cyber threat analyst module 120 and/or analyzer module 115 to collect data to support or to refute each of the one or more possible cyber threat hypotheses that could include this abnormal behavior or suspicious activity by cooperating with one or more of the cyber threat hypotheses mechanisms to form and investigate hypotheses on what are a possible set of cyber threats.

Thus, the cyber threat analyst module 120 is configured to cooperate with the AI model(s) 160 trained with machine learning on how to form cyber threat hypotheses and how to conduct investigations for a cyber threat hypothesis to form and investigate hypotheses on what are a possible set of cyber threats and then can cooperate with the analyzer module 115 with the one or more data analysis processes to confirm the results of the investigation on the possible set of cyber threats hypotheses that would include the at least one of i) the abnormal behavior, ii) the suspicious activity, and iii) any combination of both, identified through cooperation with the AI model(s) 160 trained with machine learning on the normal pattern of life/normal behavior of entities in the domains under analysis.

Note, in the first level of threat detection, the gather module 110 and the analyzer module 115 cooperate to supply any data and/or metrics requested by the analyzer module 115 cooperating with the AI model(s) 160 trained on possible cyber threats to support or rebut each possible type of cyber threat. Again, the analyzer module 115 can cooperate with the AI model(s) 160 and/or other modules to rapidly detect and then cooperate with the autonomous response module 140 to autonomously respond to overt and obvious cyberattacks, (including ones found to be supported by the cyber threat analyst module 120).

As a starting point, the AI-based cyber security appliance 100 can use multiple modules, each capable of identifying abnormal behavior and/or suspicious activity against the AI model(s) 160 trained on a normal pattern of life for the entities in the network/domain under analysis, which is supplied to the analyzer module 115 and/or the cyber threat analyst module 120. The analyzer module 115 and/or the cyber threat analyst module 120 may also receive other inputs such as AI model breaches, AI classifier breaches, etc., as a trigger to start an investigation from an external source.

Many other model breaches of the AI model(s) 160 trained with machine learning on the normal behavior of the system can send an input into the cyber threat analyst module 120 and/or the trigger module 105 to trigger an investigation to start the formation of one or more hypotheses on what are a possible set of cyber threats that could include the initially identified abnormal behavior and/or suspicious activity. Note, a deeper analysis can look at example factors such as i) how long has the endpoint existed or is registered; ii) what kind of certificate is the communication using; iii) is the endpoint on a known good domain or known bad domain or an unknown domain, and if unknown what other information exists such as registrant's name and/or country; iv) how rare; v), etc.

Note, the cyber threat analyst module 120 cooperating with the AI model(s) 160 trained with machine learning on how to form cyber threat hypotheses and how to conduct investigations for a cyber threat hypothesis in the AI-based cyber security appliance 100 provides an advantage as it reduces the time taken for human led or cyber security investigations, provides an alternative to manpower for small organizations and improves detection (and remediation) capabilities within the cyber security appliance 100.

The cyber threat analyst module 120, which forms and investigates hypotheses on what are the possible set of cyber threats, can use hypotheses mechanisms including any of 1) one or more of the AI model(s) 160 trained on how human cyber security analysts form cyber threat hypotheses and how to conduct investigations for a cyber threat hypothesis that would include at least an anomaly of interest, 2) one or more scripts outlining how to conduct an investigation on a possible set of cyber threats hypotheses that would include at least the anomaly of interest, 3) one or more rules-based models on how to conduct an investigation on a possible set of cyber threats hypotheses and how to form a possible set of cyber threats hypotheses that would include at least the anomaly of interest, and 4) any combination of these. Again, the AI model(s) 160 trained on 'how to form cyber threat hypotheses and how to conduct investigations for a cyber threat hypothesis' may use supervised machine learning on human-led cyber threat investigations and then steps, data, metrics, and metadata on how to support or to refute a plurality of the possible cyber threat hypotheses, and then the scripts and rules-based models will include the steps, data, metrics, and metadata on how to support or to refute the plurality of the possible cyber threat hypotheses. The cyber threat analyst module 120 and/or the analyzer module 115 can feed the cyber threat details to the assessment module 125 to generate a threat risk score that indicates a level of severity of the cyber threat.

The multiple Artificial Intelligence-based engines each have an interface to communicate with the other separate Artificial Intelligence-based engines. Each Intelligence-based engine has an interface to communicate with another separate Artificial Intelligence-based engine, which is configured to understand a type of information and communication that this other separate Artificial Intelligence-based engine needs to make determinations on an ongoing cyber-attack from that other Artificial Intelligence-based engine's perspective. The autonomous response engine works with the assessment module in the detection engine when the cyber threat is detected and autonomously takes one or more actions to mitigate the cyber threat. FIG. 1 shows the example components making up the detection engine to include interfaces to the prediction engine, the autonomous response engine, and the restoration engine.

The cyber threat detection engine can also have an anomaly alert system in a formatting module configured to report out anomalous incidents and events as well as the cyber threat detected to a display screen viewable by a human cyber-security professional. Each Artificial Intelligence-based engine has a rapid messaging system to communicate with a human cyber-security team to keep the human cyber-security team informed on actions autonomously taken and actions needing human approval to be taken.

A cyber security restoration engine, accessible via the restoration engine interface 190, is configured with software code and electronic hardware to take one or more autonomous remediation actions to remediate one or more nodes in a graph of a system being protected back to a trusted operational state in order to assist in a recovery from the cyber threat. The cyber security restoration engine has a tracking component for the operational state of each node in the graph of the protected system. The communication module also cooperates with the cyber security restoration engine to communicate with at least one of an external backup system and a recovery service to invoke backup remediation actions and/or recovery remediation actions to remediate one or more nodes potentially compromised by the cyber threat back to a trusted operational state, for example the state before the detected compromise by the cyber threat occurred in the protected system.

Data Aggregation

FIG. 2 illustrates a block diagram of an embodiment of an apparatus 200 to protect a network 202 from a potential cyber threat associated with a new endpoint 204. In some embodiments, the apparatus 200 is implemented by the cyber security appliance 100 of FIG. 1. As described below, the apparatus 200 may implement certain functionality represented by certain modules of the cyber security appliance 100.

The apparatus 200 comprises a memory 206, and a processor 208. The processor 208 is communicatively coupled to the memory 206.

The memory 206 is to store a representation of an artificial intelligence (AI) model. An AI model includes one or more AI models.

In some cases, the representation of the AI model may include a program trained on a set of data, where the program is readable and executable by the processor 210 to implement the functionality of the AI model according to its training. In some cases, the representation of the AI model may be a compressed version of an AI model (e.g., compressed by techniques such as pruning, quantization, knowledge distillation, or factorization techniques). In any case, the representation can be configured in any appropriate way to allow the functionality of the AI model to be implemented according to its training. The type of AI model used depends on the nature of the set of data. Examples of types of AI models that can be used are described throughout this disclosure.

In some cases, the memory 206 is a memory of the cyber security appliance 100 (e.g., where the memory is a component of a computing device such as described in further detail below in relation to FIG. 12). The memory 206 may be a volatile or non-volatile type of storage, depending on whether the representation of the AI model is to be stored temporarily or persistently.

The AI model is at least partly trained based on information aggregated from a first information source and a second information source. The first information source comprises information about a first factor that at least partly characterizes endpoints. The second information source comprises information about a second, different, factor that at least partly characterizes endpoints.

The information about the first factor may be derived from knowledge about known endpoints that are at least partly characterized by the first factor. Similarly, the information about the second factor may be derived from knowledge about known endpoints that are at least partly characterized by the second factor. In some cases, the first information source and the second information source may comprise information derived from the same endpoints. In some cases, the first information source and the second information source may comprise information derived from different endpoints. In some cases, the first information source and/or the second information source may comprise information derived from data generated by or resulting from activity of one or more known endpoints. In some cases, the first information source and/or the second information source may comprise information derived from analysis of one or more known endpoints. For example, a human or AI analyst may analyze one or more known endpoints and identify a factor that characterizes the one or more known endpoints and provide information about the factor for the first and/or second information source.

In some cases, the first information source and/or the second information source may comprise information about a plurality of factors. In some cases, the first information source may comprise information about a first set of factors and the second information source may comprise information about a second, different, set of factors. In some cases, the first and second information source comprise information about common factors, in which case, the first and second information sources each comprise information about a non-overlapping factor. In some cases, the aggregated information comprises security data, which may refer to any data that represents a security status or characteristic of endpoints. The information, including the security data, may comprise a raw dataset e.g., including hostnames extracted from a dataset, URIs extracted from a dataset, etc. By having access to raw data, the AI model may be able to learn based on this information to gain a deeper understanding of the data.

The different sources of information may refer to different entities that represent sources of information. For example, in some cases, a source of information (e.g., the first information source) may comprise information collected by a fleet of cyber security appliances associated with a cyber security provider. Another source of information (e.g., the second information source) may comprise information collected by the cyber security provider from elsewhere such as proprietary information, public information, or any form of obtained intelligence about endpoints. In another example, multiple sources of information (e.g., the first information source and second information source) may be provided by a fleet of cyber security appliances, where a first subset of the fleet of cyber security appliances provides some information (e.g., about the first factor) and a second subset of the fleet of cyber security appliances provides some other information (e.g., about the second factor).

By aggregating the information from the first information source and the second information source, the aggregated information comprises information about both the first factor and the second factor. The aggregated information therefore represents a set of training data that is to be used to train the AI model. By having information about at least one different (non-overlapping) factor, the AI model can be trained based on information about a broader range of factors than would otherwise be possible if the AI model is trained based on data from one source of information. That is, during training of the AI model, a broader range of factors can be considered during the training process. Hence, the AI model can gain a more in-depth understanding of what factors may or may not be indicative of endpoint behaviors that contribute to a profile of characteristics that characterize endpoints within a certain category (e.g., malicious, or safe). The AI model may be trained from scratch using the raw data, which may offer a higher performance than other techniques such as based on training foundational models that use natural language processing techniques to detect cyber threats.

At least some of the training at the AI model may be carried out by the apparatus 200 itself or another entity in the AI-based cyber security system for deployment to the apparatus 200. This training process may involve supervised and/or unsupervised learning, whichever is appropriate.

The processor 208 is to receive information about the new endpoint to that network.

In some cases, a computing device in the network is to communicate with the new endpoint 204. For example, the computing device may have communicated or be attempting to communicate with the new endpoint 204. As a result, the apparatus 200 may be provided with information about the new endpoint 204, which may be stored by the apparatus 200, at least temporarily (e.g., stored by the memory 206 or another memory accessible to the processor 208). Such information may include, for example, an identifier of the new endpoint 204. The information about the new endpoint 204 may further include any data indicative of a characteristic of the new endpoint 204. For example, the information may include a value for a factor that at least partly characterizes the new endpoint 204. By way of example, the factor may be geographic region associated with the new endpoint 204, and the value for the factor may be the name or another way of indicating the identity of the geographic region. In some cases, the information about the new endpoint 204 comprises security data, which may refer to any data that represents a security status or characteristic of the new endpoint 204.

The processor 208 is to determine, using the AI model, whether the information about the new endpoint 204 indicates that a characteristic of the new endpoint 204 overlaps with a profile of characteristics associated with endpoints known to be associated with a cyber threat. In response to determining that the characteristic of the new endpoint 204 overlaps with the profile of characteristics, the processor 210 is to instruct an action to be taken to protect the network from the cyber threat. By way of example, the processor 210 may implement certain functionality of the cyber security appliance 100 such as the cyber threat analyst module 120 and/or the assessment module 125. If a cyber threat is detected, the autonomous response module 140 may be instructed to take appropriate action in the manner described herein.

The training of the AI model may be such that the AI model has an understanding of a profile of characteristics associated with endpoints known to be associated with a cyber threat. Similarly, the AI model may have an understanding of another profile of characteristics associated with endpoints known to be safe. A profile of characteristics may be established by the AI model for endpoints that have same or similar behavior to each other. For example, if endpoints within a certain geographic region are active at certain times and communicate with a particular hostname, and those endpoints are associated with a cyber threat, then those factors (i.e., geographic region, time, and hostname) at least partly characterize the behavior of those endpoints. Of course, the factors that are relevant in any particular scenario are determined by the AI model itself. The number of factors considered by the AI model may exceed the two factors (i.e., the first and second factor) considered above.

Since the AI model has an understanding of the profile of characteristics associated with endpoints known to be associated with a cyber threat, the AI model may be used in the determination of whether the new endpoint 204 has a characteristic (based on the information about the new endpoint 204) that overlaps with the profile of characteristics. The characteristic of the new endpoint 204 includes one or more characteristics. For example, there may be one or more factors that at least partly characterize the new endpoint 204.

Since there may not be an exact overlap in characteristics between the new endpoint 204 and the endpoints known to be associated with a cyber threat, the overlap may be at least partial. The degree of overlap needed to establish that the new endpoint 204 has a characteristic that overlaps with profile of characteristics may depend on the AI model establishing what degree of overlap is needed to be able to classify that the new endpoint 204 has the characteristic. The AI model may weight different factors according to which factors are the most or least informative about endpoint characteristics. If the information about the new endpoint 204 at least partly represents a factor that is considered by the AI model to be more or highly informative that the characteristic of the new endpoint 204 is potentially indicative that the new endpoint 204 represents a cyber threat, it may be established that there is an overlap or a substantial overlap between the characteristic of the new endpoint 204 and the profile of characteristics. Similarly, if the information about the new endpoint 204 at least partly represents a factor that is considered by the AI model to be less or not very informative that the characteristic of the new endpoint 204 is potentially indicative that the new endpoint 204 represents a cyber threat, it may be established that there is no overlap or no substantial overlap between the characteristic of the new endpoint 204 and the profile of characteristics.

The classification performance of the AI model may be improved in terms of accuracy and/or precision as a result of being trained based on information aggregated from a first information source and a second information source, where first information source and the second information source comprise information about a non-overlapping factor that at least partly characterizes endpoints. For example, false positives and/or false negatives may be reduced by using the AI model trained based on the aggregated information. Aggregating information in this manner and training an AI model based on the aggregated information may provide the AI model with a deeper, more comprehensive understanding of what makes an endpoint malicious or safe. The amount of data generated by or as a result of activity by endpoints is very large. Leveraging machine learning techniques may help to understand patterns and trends that would not otherwise be readily identified in a very large volume of data.

The aggregation of information from the first information source and the second information source (and from, in some cases, third or more sources) and use of such aggregated information for training the AI model may represent a form of 'deep space inoculation' that can be considered to be a threat sharing intelligence product from multiple different sources that each can look at different factors of an endpoint.

The apparatus 200 (which may be referred to in the following discussion as the cyber security appliance 100 for ease of understanding) can use this deep space inoculation. Deep space inoculation may look at the internet and cloud as a threat sharing intelligence product from multiple different sources (e.g., the first information source and the second information source, and any other sources) that each can look at different factors (e.g., the first information source can look at the first factor (and any other factors), and the second information source cam look at the second factor (and any other factors)) of an endpoint that can be shared with and drawn from cyber security appliances. The deep space may use the inoculation framework to look at the internet and cloud at large. Deep space may refer to essentially gathering together all the high-fidelity data that we have from emails and known phishing endpoints. Deep space may examine data that an AI analyst has produced on highly likely dodgy endpoints from investigations and incidents. This information may be pushed up into essentially a database. For example, host names and endpoints that have been flagged by AI analysts in each cyber security appliance, like human cyber threat analysts working in a Security Operations Center (SoC), or that have been seen in like highly critical model breaches may be pushed into the database. The information is aggregated and analyzed to characterize endpoints. The database can have a section of basically known bad endpoints and their characteristics. The system, as implemented by certain embodiments described herein, can use this selection of known bad endpoints and their characteristics in order to use that information to try and find things that look similar. For example, the system may know the known endpoint's name, geographic location, how old it is, where is it registered, what is the content of the website, etc. The system can then use this information to try and find new endpoints that were previously not identified as a bad endpoint. The list of similar endpoints that share a substantial overlap of characteristics with known bad endpoints is push out to the fleet of cyber security appliances as a big list of known bad endpoints, and similar endpoints that share a substantial overlap of characteristics with known bad endpoints to prevent customer's users from going to them. Thus, an intelligence feed from human analysts, external third-party services, and the AI (machine learning based) cyber security analyst in each cyber security appliance across the fleet may be shared with other cyber security appliances in the fleet. This deep space inoculation closely ties into trying to capture behavioral profiles through AI analysts that is pushed out to other AI analysts and share more. Multiple types of intelligence may be shared and merged to create a (composite) profile of characteristics of known bad endpoints and then that large composite profile can be compared to endpoints across the internet. The composite profile of characteristics of known bad endpoints may also include analysis of a behavior of the known bad endpoints from a component specifically configured to analyze behavior of endpoints. An overall combination of threat intelligence from many sources may include any combination of intelligence from an AI analyst, human intelligence, researcher tool, etc., to categorize known endpoints that are flagged as bad. The system may try to identify similar endpoints that are potentially bad ones both across the fleet and generally across the Internet. In an example, the system may know that an endpoint is bad because it was used for phishing.

The processor 210 instructing an action to be taken to protect the network from the cyber threat may include informing another entity to do something to protect the network as described herein. For example, in the case that the apparatus 200 is part of the cyber security appliance 100, the processor 210 may instruct or cause the autonomous response module 140 (or any other appropriate module) to take appropriate action to protect the network. In any case, the apparatus 200 may provide an instruction to take action in response to the cyber threat to an entity responsible for protecting the network in a security platform such as depicted by FIG. 8.

Some further embodiments relating to the apparatus 200 and related embodiments are now described.

In some embodiments, factors that at least partly characterize endpoints (e.g., known or new endpoints) comprise one or more of the following factors.

A factor may be an identifier of the new endpoint. For example, the identifier may be an address of the new endpoint, a URL, a shortened URL, a Universal Resource Identifier (URI), a hostname, device identity, etc.

A factor may be a geographic region of the new endpoint. For example, the geographic region can be defined at different levels of granularity e.g., in terms of address, street, district, city, county, country, continent, etc.

A factor may be age of the new endpoint. For example, the age may refer to a time period over which the new endpoint has existed or been registered.

A factor may be where the new endpoint is registered. For example, the new endpoint may be registered with a certain registrar e.g., for website domain registration.

A factor may be content accessible at the new endpoint. For example, the content may refer to the type of content available at the website such as news, shopping, text, music, video, banking services, government services, etc.

A factor may be an activity time associated with the new endpoint. For example, the activity time may refer to parameters such as a time or range of time during which the new endpoint is active or unactive. Other examples of parameters include typical time of operation (e.g., when the new endpoint starts communicating or is active), typical length of operation (e.g., active hours during a time period), intermittency of communications with other nodes (e.g., how frequently the new endpoint communicates with other nodes), etc.

A factor may be a number of connections associated with the new endpoint. For example, the new endpoint may have connected with a certain number of nodes for the purpose of transmitting and/or receiving data to/from those noses.

A factor may be an identity of one or more nodes that have communicated with the new endpoint. For example, the identity may refer to a name or address of the node.

A factor may be metadata associated with the new endpoint. For example, the metadata may indicate a title, description, or other information about the new endpoint.

Any other factors that at least partly characterize endpoints may be contemplated by the AI model if such factors are included in the aggregated information.

Thus, in some embodiments, the information about a factor or a new endpoint 204 includes a factor value corresponding to a factor that at least partly characterizes endpoints including the new endpoint. A factor value may refer to a string or numerical value within the information. Thus, a factor may refer to an attribute of the endpoint such as identifier, geographic region, and so on. Correspondingly, a factor value may refer to an attribute value associated with the endpoint such as the endpoint address, specific location of the endpoint, etc.

In some embodiments, the information aggregated from the first information source and the second information source is derived from one or more of: publicly available information; privately held information; a database comprising information about malicious endpoints; a database comprising information about safe endpoints; a database comprising information about emails sent by malicious entities; a database comprising information about emails sent by safe entities; data provided by a fleet of cyber security appliances; etc.

In some embodiments, the processor 210 is to determine that the characteristic of the new endpoint 204 overlaps with the profile of characteristics by identifying that a metric defining a distance between a factor value representative of the characteristic of the new endpoint 204 and a corresponding factor value of endpoints known to be associated with a cyber threat is within a specified range indicative of characteristic overlap. A distance may refer to how much overlap there is between a factor value defining the behavior of the new endpoint 204 and corresponding factor values of endpoints associated with the profile of characteristics. A short distance may mean there is substantial overlap, whereas a long distance may mean there is not much overlap.

In some embodiments, the processor 210 is to receive the information about the new endpoint 204, and in response, determine whether information about the new endpoint 204 indicates that the characteristic of the new endpoint 204 overlaps with the profile of characteristics. For example, the information may be received by the apparatus 200 when a user in the network interacts or tries to interact with the new endpoint 204. This interaction or attempted interaction may be detected and the information about the new endpoint 204 may be provided to the apparatus 200 so that the apparatus 200 can take an action based on whether the new endpoint 204 is malicious or safe.

In some embodiments, one or more of the first and second information source belongs to a fleet of cyber security appliances. Thus, the fleet of cyber security appliances may provide at least some of the aggregated information. A deployed fleet of cyber security appliances may provide wide visibility of emerging threats and therefore the AI model can be updated rapidly to react to new threats.

FIG. 3 refers to a flowchart of an embodiment of a method 300 of protecting a network from a potential cyber threat associated with a new endpoint 204 to the network. The method is computer implemented, for example, by a processor of the cyber security appliance 100 or another entity in the security platform such as depicted by FIG. 8. The method 300 refers to the functionality implemented by the apparatus 200.

The method 300 comprises, at block 302, determining, using an artificial intelligence (AI) model, whether information about the new endpoint 204 indicates that a characteristic of the new endpoint 204 overlaps with a profile of characteristics associated with endpoints known to be associated with a cyber threat. The AI model is at least partly trained based on information aggregated from a first information source and a second information source, where the first information source comprises information about a first factor that at least partly characterizes endpoints. The second information source comprises information about a second, different, factor that at least partly characterizes endpoints.

The method 300 further comprises, at block 304, in response to determining that the characteristic of the new endpoint 204 overlaps with the profile of characteristics, instructing an action to be taken to protect the network from the cyber threat.

Further embodiments referred to in relation to the functionality of the apparatus 200 may be implemented as blocks of a computer-implemented method.

Masked Properties

There may be scenarios where the information about the new endpoint 204 does not accurately reflect what the new endpoint 204 represents. In some scenarios, what the new endpoint 204 actually represents may be masked in some way. By way of example, a URL identifying the new endpoint 204 may be shortened by a URL shortening service or the URL may be modified in some other way.

In some embodiments, the AI model is trained to detect a property associated with the new endpoint 204, where the property is masked in the information about the new endpoint 204.

The aggregated information may include training data about known endpoints that have an associated property that at least partly masks what the endpoint represents. However, by training the AI model based on such training data, the AI model may be capable of predicting whether the information about the new endpoint 204 potentially contains masked information. For example, if the information about the new endpoint 204 comprises an identifier such as a shortened URL for directing requests to the new endpoint 204, the AI model may be able to detect that a shortened URL has been used. A shortened URL or otherwise masked information may be a factor indicative of a characteristic of endpoints known to represent a cyber threat. The AI model may be trained to attach a higher degree of risk to new endpoints 204 that contain masked information than those that do not mask information such as the actual URL of the new endpoint 204.

By being trained to improve detection of the masked property, the AI model may provide improved performance in terms of accuracy and/or precision of detecting cyber threats, which may improve the protection of the network.

In some embodiments, the property is an identifier of the new endpoint 204 that is masked by being represented by a different identifier. For example, the different identifier may be a shortened/similar URL.

In some embodiments, the property is an embedding in a message that is masked from being detected by a recipient of the message. For example, the embedding may be a file hidden in the message.

In some embodiments, the property is a service associated with the new endpoint 204. For example, the endpoint may be used to provide a service that is not accurately represented in the information about the new endpoint 204 because the category of the service is either not described or is described as being something else.

In some embodiments, the AI model is at least partly trained based on Masked-Language Modeling (MLM).

An example of detecting a property that is potentially masked is now described. In this example, probable URL shorteners are identified using an AI model based on a fine-tuned hostname-specific large language model. Similar principles may be used to identify other types of masked properties.

The apparatus 200 (which for the purpose of this discussion may be at least partly implemented by the cyber security appliance 100) can use a Fine-Tuned Hostname-Specific Large Language Model to identify Probable URL shorteners. Identifying Probable URL Shorteners with a Fine-Tuned Hostname-Specific Large Language Model can be part of the inoculation/deep space service. The idea can include that the cyber security appliance 100 is not merely putting short links into a big data set of bad host names. Many different services offer URL shortening meaning that short links may be observed frequently in everyday use of internet services. Short links may be represented by, for example, Bitly® links or a certain kind of Google links. There may be little value in putting those into a big training data set of bad host names because the AI model may identify that a certain Bitly® link is bad rather than necessarily the endpoint associated with that short link.

Link shortening services are ubiquitous due to the legitimate need to produce short URLs to fit into the confines of e.g., text messages and tweets. However, since they provide legitimate hosts that redirect to any user-provided endpoint, they may also be frequently used for malicious purposes such as phishing. As a result, they frequently appear in alerts and lists of malicious hostnames, however they are not inherently malicious, and so should not be highlighted as malicious hosts in general by services such as deep space/inoculation. When combined with the reality that there are large numbers of link shortening services, with new ones regularly appearing, it would be extremely useful to automatically identify possible link shortening services without having to rely on known lists.

The cyber security appliance 100 may implement a large language model with a similar architecture to the Bidirectional Encoder Representations from Transformers (BERT) transformer model but trained on masking of hostname-hostname links extracted from common crawl data. Thus, the AI model may be trained to have an understanding of not just the form of hostnames, but also what they are likely to link to. In other similar words, the AI model may be trained to gain a semantic understanding of the role of a hostname (which may be representative of a new endpoint 204) in the wider internet. Consequently, the AI model can be fine-tuned specifically on the task of detecting hostnames associated with link shortening services, leading to a high-performance classifier.

In some cases, the AI model may be trained using a transformer approach on pre-existing link shortening host names. This includes, training the AI model on what shortened host names tend to look like how they tend to be constructed and then predicting whether new host names whether they are a link shortening service or not, and therefore should be at least one of discarded from the database or associated with the actual host name. A similar approach can be used to train AI models for a wide range of hostname analysis problems. The example of identifying link shortening services refers one possible application of many possible applications of detecting a property that is masked in the information about the new endpoint.

Detecting Command and Control Servers

Some endpoints may not be directly responsible for malicious activity. For example, some bad actors may use command and control servers in order to cause other nodes that have been compromised to take part in attacks. Machine learning-based approaches may be leveraged to autonomously detect command and control servers and monitor threat actors' activities on the Internet.

In some embodiments, the AI model is trained to detect an indication that a command and control server is associated with the new endpoint 204. The AI model may be at least partly trained based on information indicative of a behavior profile of command and control (C&C) servers.

The aggregated information may comprise information about factors that at least partly characterize the behavior of C&C servers. For example, a behavior profile of a C&C server associated with compromised nodes may be understood by the trained AI model if the AI model is trained with data associated with known C&C servers and nodes under the control of the known C&C servers. In some cases, such data may be obtained by scanning the Internet Protocol (e.g., V4) range and seeing how all servers respond in that IPV4 range (and using those responses to train the AI model to be able to identify servers with similar behaviors to C&C servers). Therefore, the AI model may be capable of recognizing that a C&C server is controlling a node (i.e., a new endpoint 204) and whether or not that node and associated C&C server represents a cyber threat. The AI model may also be able to cluster C&C servers based on type such as Cobalt Strike or Posh.

In some embodiments, the information indicative of the behavior profile of command and control servers comprises information derived from a certificate associated with a known command and control server. For example, the certificate may comprise Secure Sockets Layer (SSL) certificate information such as issuer, expiration and other attributes.

In some embodiments, the information indicative of the behavior profile of command and control servers comprises information derived from a metric indicative of a pattern of responses from different services. For example, a C&C server may interact with one or more nodes that are involved in the provision of one or more services. Each service may respond in a certain way to requests, and such responses may have a pattern. A metric that is indicative of the pattern of responses (e.g., the metric could be a frequency with which a service responds to a request) may be used to form a behavior profile of C&C servers and nodes under control of such servers.

In some embodiments, the information indicative of the behavior profile of command and control servers comprises information derived from a fingerprint indicative of a known command and control server. For example, the fingerprint may comprise a JA3 hash.

In some embodiments, the information indicative of the behavior profile of command and control servers comprises information derived from a handshake indicative of a known command and control server. For example, the handshake may comprise a Transmission Control Protocol (TCP) handshake.

In some embodiments, the information indicative of the behavior profile of command and control servers comprises information derived from information about registered domains. For example, the information about registered domains may include new, safe, and/or compromised domains.

In some embodiments, the information indicative of the behavior profile of command and control servers comprises information derived from information associated with communications with a known command and control server. For example, such information associated with communications may include HyperText Markup Language (HTML) content, headers, metadata, known common paths that indicate the user of a C&C server, etc.

The cyber security appliance 100 can cooperate with an inoculation/deep space system on the cloud platform to leverage machine learning to autonomously detect command and control servers and monitor threat actors' activities on the Internet. The detection of command and control servers and monitoring threat actors' activities on the internet is an important and complicated task. C&C servers may often be used by Red teamers in their legitimate tasks and also by cybercriminals to remotely control networks of compromised devices. Many solutions for detecting C&C servers rely on statistical analysis, rules to block known and reported servers and some advanced solutions based on behavior. This means that C&C servers may be detected once they start communicating with the end user.

The system of the present disclosure may collect a series of information for aggregation by scraping the Internet. The system may generate profiles consisting of certain responses that they get back from those endpoints associated with C&C servers. This may include, for example, SSL Certificates, patterns of the responses from different services, JA3 responses fingerprinting, TCP handshakes, etc. All of these endpoints that were monitored and scraped provide data and characteristics. The system may train one or more machine learning algorithms based upon an aggregated data set that has been determined, with high confidence, to refer to a malicious C&C server. The data forming the data set in the database may be populated by the machine learning detection in the cyber security appliance 100 (e.g. the clusters formed, and particular attributes given more weight associated with the known malicious command and control servers), email phishing links, endpoints that the cyber threat analyst module found and flagged in incidents, and end endpoints that human analysts have found and flagged. The trained machine learning algorithms can detect a profile of a C&C server. The profiles can be matched up based on their characteristics to see if they match up to known past threat actors, and how similar they are, and if based on their similarity, raise up the rank of how threatening they are.

The detection of command and control servers and monitor threat actors' activities on the internet in accordance with certain embodiments aims to detect C&C servers in the wild by scanning the internet, checking newly registered domains and existing compromised ones as well. This approach may at least partly rely on analyzing multiple indicators/particular attributes such as HTML content, Headers, metadata and known common paths of the C&C servers. This may include looking for patterns of each of the C&C frameworks the cyber security appliance 100 are analyzing. Another indicator is to analyze the SSL certificates associated with the websites. C&C servers often use self-signed or otherwise suspicious SSL certificates, which can be detected by examining JARM fingerprinting, the certificate's issuer, expiration date, and other attributes. Additionally, the TCP handshake process can provide valuable information for detecting C&C servers in the wild. By examining the initial exchange of messages between a client and server, it may be possible to identify certain patterns or anomalies that may indicate the use of a C&C server.

Finally, the use of machine learning algorithms over all the previously stated indicators can be effective in detecting C&C servers. These algorithms will be trained on large datasets collected using sensors (i.e., detectors) over the last few years. This data may contain details of known C&C servers that were flagged by a cyber security solution provider after first communications with an end user. This approach may allow for automatically identifying new C&C servers as they emerge before any interactions with the end user in the network.

By combining one or more of these methods, the cyber security appliance 100 may create an AI model that is able to effectively detect C&C servers without relying on manual work done by threat hunters and Blue Teams to monitor, detect and report them. As part of the deep space approach, the results of the research may be shared with the wider community to help detect malicious actors.

In addition to creating a model to detect C&C servers, the cyber security appliance 100 may also investigate if it is possible attribute these various deployments to known threat actors or campaigns. The findings on this can help deepen understanding of how these actors conduct their operations, if certain patterns can be determined and possibly in the future help prevent large scale malicious operations or attacks from happening.

Some further details are now provided on the subject of C&C (C2) servers to support the relevant embodiments described herein.

Some characteristics and attributes from C&C servers may be identified for use by machine learning model(s). For example, one or more characteristics of a C&C server may be based on its type (Cobalt Strike, Brute Ratel C4, Covenant, Posh C2, . . . )

Web Page analysis may be used, which may rely on gathering all possible information about the C2 page from html, headers, favicon, technologies fingerprint. Further examples of characteristics are described below.

SSL: SSL certificates may contain a lot of information that can be used to fingerprint servers like JARM, Certificate Serial Number, Cert issuer, . . . .

TCP Handshake: by performing the TCP handshake the cyber security appliance 100 may find patterns about these servers that can be used to detect them.

The approaches described herein may combine some or all the characteristics (such as described above) in one (AI) model.

Unsupervised machine learning may be used for clustering data based on attributes.

Supervised machine learning may be used for labelling and increase of precision.

A large-scale scan of the internet may be performed in order to find live C&C servers.

Patterns of known threat actors may be found, for example, by using the approach findings to link detected C&C servers to known threat actors. Thus, it may be possible to link particular command and control servers to a specific threat based on their characteristics.

The research may be extended to more C&C frameworks. For example, there are more than 100 known C&C framework and each one has its own characteristics.

The system may attempt to detect malicious C&C servers. The malicious C&C servers may be shared throughout the fleet of cyber security appliances 100 so that both non-compromised and compromised networks can cut off connections/block calls from malware back to those C&C servers. The system may attempt to detect malicious C&C servers before their associated malware compromises a particular network so that additional safeguards can be put in place, such as indicators and the best autonomous response actions to take, to stop malware associated with those malicious C&C servers from infecting the network in the first place.

Metrics Characterizing Endpoints

A large amount of information is available to characterize endpoints. However, this information may be used in all sorts of ways in order to perform such characterization. For example, certain information may be represented by a metric that has been obtained in a certain way. Such a metric may yield new insights that have not yet been considered and are not immediately evident from the data used to calculate the metric. Accordingly, there is described a method to combine the deep-space/aggregated information to generate a new metric that provides useful insights. In some embodiments, the metric is a meta rarity score across a fleet of cyber security appliances.

In some embodiments, the aggregated information comprises a metric that at least partly characterizes a known endpoint.

In some embodiments, the metric is derived from data associated with activity of the known endpoint, where the data is obtained by a plurality of detectors (which may be referred to herein as 'sensors' and each sensor could be, for example, a cyber security appliance of a customer of a cyber security provider). The metric may be a combined metric based on a combination of a plurality of metrics determined by the plurality of detectors that has been weighted according to a relevance of the metric determined by each detector.

In some embodiments, the combined metric is based on a distribution indicative of how many detectors of the plurality of detectors have determined that the metric associated with the detector falls within one of a set of intervals that represent a range of metric values. A weighting function (for example, an exponential function and/or a logarithmic function) may be applied to the metric value associated with each interval based on how many detectors fall within the interval. An example of this approach is described below.

In some embodiments, the data associated with the activity of the known endpoint is indicative of: a popularity of communications with the known endpoint or a node (e.g., an IP address, autonomous system number, etc.) associated with the known endpoint; or a rarity of communications with the known endpoint or a node associated with the known endpoint.

The metric may be a useful way of extracting additional insight from information about endpoints. Much information may be available and finding a way to represent such information as a metric may be useful. The metric may therefore represent a potential 'factor' (e.g., a first factor or second factor) that at least partly characterizes endpoints. In other similar words, the metric may be indicative of a behavior of the endpoint. For example, the metric may represent a measurement or statistic (such as an average) indicative of the behavior of the endpoint. A metric may represent a quantity derived from behavior of the endpoint. Example quantities may include an amount of data sent and/or received by the endpoint, a number of communications with nodes, a frequency of communication, etc., and/or any statistics derived from such quantities. The example quantity 'rarity' is discussed in more detail below.

Deep space can be a standalone cloud platform entity that acts as a data repository for data across a fleet of cyber security appliances. The cloud platform may aggregate all the data that a cyber security provider has from expert third party analysts, AI models in the cyber security appliance and other systems, human analysts, investigations, scraping of the Internet, etc. The databases in the cloud platform of a deep space may create an architecture that aggregates all of that data and then pieces together the rarity scores associated with that data being stored to try and identify things like bad host names which could then be sent to the inoculation service, or mindful trend information for the system to identify emerging threat actors, etc. However, the rarity information and its associated scoring from each of these sources supplying data into the deep space data may use different techniques and scales to determine, for example, the rarity scoring associated with the supply pieces of data into the data storage repository. The system may perform analysis and calculations to unite up to all of data, such as rarity information, and other scoring to a common metric to try and identify truly, for example, bad domains based on rarity and other data which can then be sent over to the inoculation service based on fleet wide knowledge.

A meta score can be established for stored data from each of these different sources that maintains the host's data and score but augments with this meta score to reflect fleetwide cyber security appliance and other knowledge all on a common metric regarding that aspect of the stored data. Each component in the cyber security system can have slightly different way of computing rarity and badness differently. This method may find a way of identifying truly rare domains and truly bad domains based upon a meta score that the system generates from all of those components. Note, those components rarity scoring may not be taken with equal weight.

An example summary of an approach to meta scoring is now provided.

The popularity P of an external hostname is a score used by the cloud platform aggregating the information from the fleet of Artificial Intelligence based cyber security appliances and it provides a measurement of the devices from a given organization connecting to this hostname within a period of time. Another interesting parameter is its reverse score, 1-P, known as hostname rarity. A hostname with 0% rarity is connected by nearly all the devices of this organization whereas a hostname with 100% rarity is connected by one or a very a small number of devices.

The rarity score may not be a good indicator per se of malicious or suspicious activity. Multiple factors, e.g., local compliance rules, geographical or cultural factors might increase or decrease the rarity score of a hostname across different networks. For example, social media hostnames might have high rarities in some corporate/industrial networks due to compliance or regulatory issues and lower rarities in some educational networks.

Rarity itself is dependent on the likelihood of a particular network interacting with a hostname. For example, certain hostnames are rare in some networks because such networks do not interact with such hostnames for cultural or compliance reasons (whereas in other networks, there is lots of interaction with such hostnames). Just because a hostname is rare in some networks, this does not mean that the hostname is associated with malicious activity. Therefore, it can be useful to establish a 'global' rarity score that takes into account the experiences of lots of networks with hostnames to provide a more useful score about the rarity of a hostname, and the resultant rarity score can be fed into the information to be aggregated and considered as a factor that at least partly characterizes endpoints. Rarity itself may not be a strong indicator of whether or not an endpoint is malicious. However, the AI model may attribute a weight to rarity when rarity is a given factor within the aggregated information.

An example method of the approach to meta scoring is now provided.

The proposed method defines a new combined score for a given endpoint based on the local rarity data extracted by passive sensors observing different networks. The goal of this score is to reduce or suppress the inherent uncertainties of the local rarity of that endpoint which might be very popular in certain networks and very rare in others.

Consider a set of N different sensors gathering the rarity data for the hostname example[.]com from multiple different networks. An intermediate system located in the cloud may receive these rarity scores and count the number of sensors that are returning the local rarity scores within certain intervals, e.g., 0 to 25%, 25% to 50%, etc. (see FIG. 4 for more details in an example).

FIG. 4 illustrates a table of data indicative of a rarity score of a particular hostname determined by multiple detectors. FIG. 4 refers to a schematic process to generate a global rarity score based on the local rarity scores observed by 10 different sensors for the hostname example[.]com. As such, the hostname example[.]com is being observed by ten sensors (labeled Sensor 1 through to Sensor 10) with various rarities expressed as a percentage. An intermediate system may collect this data and count the number of sensors that return this rarity within certain intervals. In this example, the intervals are (1) number of counts with rarity equal to 0%; (2) number of counts with rarity between 1% and 50%; (3) number of counts with rarity between 51% and 99%; and (4) number of counts with rarity equal to 100%. Based on this information which represents 'global' information, a new and more representative rarity score is defined for the hostname example[.]com. In this case, the new rarity score is 7%.

By combining this information, the method returns a new score which appropriately balances the cases with low and high local rarities. In some cases, the score may be computed as follows:

At part 1, for each particular interval, an intermediate score is defined following a function (i.e., an exponential function) that exponentially decreases with the number of counts for this particular interval.

At part 2, the values obtained for each interval are then averaged using normalized weights which exponentially decrease with the local rarity.

The normalizing approach is intended to take into account that sensors returning low rarities, e.g., 0%, should have a higher weight in the final score than sensors returning higher rarities, e.g., 100%, because low rarities indicate that at least one sensor is seeing hundreds or even more devices connecting to that endpoint.

FIG. 5 refers to a set of graphs indicating different intervals of rarity scores detected by different sensors for a selection of hostnames. The set of graphs are labelled (a) through (p) and represent the global rarity score function computed from a selection of approximately 30,000 hostnames whose rarity scores have been binned in 4 different rarity intervals as indicated in FIG. 4. The global rarity score function is constructed by comparing the number counts in different pairs of rarity intervals (i.e., pairwise combinations of rarity==0, 0<rarity<=50, 50<rarity<=95, 95<rarity<=100) to generate the set of graphs depicted by FIG. 5. The x-axis refers to local rarities for the indicated rarity interval. The y-axis refers to the number of counts of sensors for the indicated rarity interval. The scale of the axis is logarithmic with the x axis spanning values from 10^0 to above 10^5 in most cases, and the y-axis spanning 10^0 to 10^4 in most cases. The rarity score can vary between 0 and 1 (and correspond to percentages 0 to 100%, respectively). Note, for example, that the rarity score increases (see the lower left hand corner of graphs (k), (o), (p)) in cases with low number counts and high local rarities, e.g., 95% to 100%, and rapidly decreases (see data points for the other locations on graphs containing data) for lower rarity intervals or high number counts.

Training

As referred to in relation to the apparatus 200, a trained AI model may be used in the protection of a network from a potential cyber threat associated with a new endpoint. Methods of training such an AI model are now discussed.

FIG. 6 refers to a flowchart of an embodiment of a method 600 of training an AI model for use in protecting a network from a potential cyber threat associated with a new endpoint. The trained AI model may be deployed to provide the functionality of the apparatus 200, to which reference should now be made. The method 600 is computer implemented. In some cases, the method 600 may be implemented by the apparatus 200 itself. In some cases, the method 600 may be implemented by another entity in the security platform such as depicted by FIG. 8. The resulting AI model from the training may be used in situ by the same entity that performs the training process or deployed to another entity using any appropriate technique.

The method 600 comprises, at block 602, accessing information aggregated from a first information source and a second information source. The first information source comprises information about a first factor that at least partly characterizes endpoints. The second information source comprises information about a second, different, factor that at least partly characterizes endpoints. In some cases, the information may be accessed as a result of being received by the entity that performs the method 600. For example, an entity in the security platform may aggregate the information and then send the aggregated information to an entity that performs the training. In some cases, the same entity that aggregated the information may perform the training.

The method 600 comprises, at block 604, training an AI model, using the information aggregated from the first information source and the second information source, to determine whether information about a new endpoint to the network indicates that a characteristic of the new endpoint overlaps with a profile of characteristics associated with endpoints known to be associated with a cyber threat.

Some embodiments relating to the method 600 are now described.

FIG. 7 refers to a flowchart of an embodiment of a method 700 involved in the training of an AI model for use in protecting a network from a potential cyber threat associated with a new endpoint. The method 700 may be implemented in conjunction with the method 600. The method 700 may be implemented by the same entity that implements the method 600.

In some embodiments, the method 700 comprises, at block 702, receiving information about the new endpoint. The method 700 further comprises, at block 704, further training the AI model based on the received information. When a new endpoint is observed within a security platform, the information about the new endpoint may be used to further refine the training of the AI model. In this manner, the AI model may be kept up to date with the latest endpoints, and hence may be kept up to date with new potential threats as they emerge.

Training of AI Pre-Deployment and then During Deployment

In step 1, an initial training of the Artificial Intelligence model trained on cyber threats can occur using unsupervised learning and/or supervised learning on characteristics and attributes of known potential cyber threats including malware, insider threats, and other kinds of cyber threats that can occur within that domain. Each Artificial Intelligence can be programmed and configured with the background information to understand and handle particulars, including different types of data, protocols used, types of devices, user accounts, etc. of the system being protected. The Artificial Intelligence pre-deployment can all be trained on the specific machine learning task that they will perform when put into deployment. For example, the AI model, such as AI model(s) 160 or example (hereinafter "AI model(s) 160"), trained on identifying a specific cyber threat learns at least both in the pre-deployment training i) the characteristics and attributes of known potential cyber threats as well as ii) a set of characteristics and attributes of each category of potential cyber threats and their weights assigned on how indicative certain characteristics and attributes correlate to potential cyber threats of that category of threats. In this example, one of the AI model(s) 160 trained on identifying a specific cyber threat can be trained with machine learning such as Linear Regression, Regression Trees, Non-Linear Regression, Bayesian Linear Regression, Deep learning, etc. to learn and understand the characteristics and attributes in that category of cyber threats. Later, when in deployment in a domain/network being protected by the cyber security appliance 100, the AI model trained on cyber threats can determine whether a potentially unknown threat has been detected via a number of techniques including an overlap of some of the same characteristics and attributes in that category of cyber threats. The AI model may use unsupervised learning when deployed to better learn newer and updated characteristics of cyberattacks.

In an embodiment, one or more of the AI models 160 may be trained on a normal pattern of life of entities in the system are self-learning AI model using unsupervised machine learning and machine learning algorithms to analyze patterns and 'learn' what is the 'normal behavior' of the network by analyzing data on the activity on, for example, the network level, at the device level, and at the employee level. The self-learning AI model using unsupervised machine learning understands the system under analysis' normal patterns of life in, for example, a week of being deployed on that system, and grows more bespoke with every passing minute. The AI unsupervised learning model learns patterns from the features in the day-to-day dataset and detecting abnormal data which would not have fallen into the category (cluster) of normal behavior. The self-learning AI model using unsupervised machine learning can simply be placed into an observation mode for an initial week or two when first deployed on a network/domain in order to establish an initial normal behavior for entities in the network/domain under analysis.

Thus, a deployed Artificial Intelligence model 160 trained on a normal behavior of entities in the system can be configured to observe the nodes in the system being protected. Training on a normal behavior of entities in the system can occur while monitoring for the first week or two until enough data has been observed to establish a statistically reliable set of normal operations for each node (e.g. user account, device, etc.). Initial training of one or more Artificial Intelligence models 160 trained with machine learning on a normal behavior of the pattern of life of the entities in the network/domain can occur where each type of network and/or domain will generally have some common typical behavior with each model trained specifically to understand components/devices, protocols, activity level, etc. to that type of network/system/domain. Alternatively, pre-deployment machine learning training of one or more Artificial Intelligence models trained on a normal pattern of life of entities in the system can occur. Initial training of one or more Artificial Intelligence models trained with machine learning on a behavior of the pattern of life of the entities in the network/domain can occur where each type of network and/or domain will generally have some common typical behavior with each model trained specifically to understand components/devices, protocols, activity level, etc. to that type of network/system/domain. What is normal behavior of each entity within that system can be established either prior to deployment and then adjusted during deployment or alternatively the model can simply be placed into an observation mode for an initial week or two when first deployed on a network/domain in order to establish an initial normal behavior for entities in the network/domain under analysis. During deployment, what is considered normal behavior will change as each different entity's behavior changes and will be reflected through the use of unsupervised learning in the model such as various Bayesian techniques, clustering, etc. The AI models 160 can be implemented with various mechanisms such neural networks, decision trees, etc. and combinations of these. Likewise, one or more supervised machine learning AI models 160 may be trained to create possible hypotheses and perform cyber threat investigations on agnostic examples of past historical incidents of detecting a multitude of possible types of cyber threat hypotheses previously analyzed by human cyber security analyst. More on the training of AI models 160 are trained to create one or more possible hypotheses and perform cyber threat investigations will be discussed later.

At its core, the self-learning AI models 160 that model the normal behavior (e.g. a normal pattern of life) of entities in the network mathematically characterizes what constitutes 'normal' behavior, based on the analysis of a large number of different measures of a device's network behavior—packet traffic and network activity/processes including server access, data volumes, timings of events, credential use, connection type, volume, and directionality of, for example, uploads/downloads into the network, file type, packet intention, admin activity, resource and information requests, command sent, etc.

Clustering Methods

In order to model what should be considered as normal for a device or cloud container, its behavior can be analyzed in the context of other similar entities on the network. The AI models (e.g., AI model(s) 160) can use unsupervised machine learning to algorithmically identify significant groupings, a task which is virtually impossible to do manually. To create a holistic image of the relationships within the network, the AI models and AI classifiers employ a number of different clustering methods, including matrix-based clustering, density-based clustering, and hierarchical clustering techniques. The resulting clusters can then be used, for example, to inform the modeling of the normative behaviors and/or similar groupings.

The AI models and AI classifiers can employ a large-scale computational approach to understand sparse structure in models of network connectivity based on applying L1-regularization techniques (the lasso method). This allows the artificial intelligence to discover true associations between different elements of a network which can be cast as efficiently solvable convex optimization problems and yield parsimonious models. Various mathematical approaches assist.

Next, one or more supervised machine learning AI models are trained to create possible hypotheses and how to perform cyber threat investigations on agnostic examples of past historical incidents of detecting a multitude of possible types of cyber threat hypotheses previously analyzed by human cyber threat analysis. AI models trained on forming and investigating hypotheses on what are a possible set of cyber threats can be trained initially with supervised learning. Thus, these AI models can be trained on how to form and investigate hypotheses on what are a possible set of cyber threats and steps to take in supporting or refuting hypotheses. The AI models trained on forming and investigating hypotheses are updated with unsupervised machine learning algorithms when correctly supporting or refuting the hypotheses including what additional collected data proved to be the most useful. More on the training of the AI models that are trained to create one or more possible hypotheses and perform cyber threat investigations will be discussed later.

Next, the various Artificial Intelligence models and AI classifiers combine use of unsupervised and supervised machine learning to learn 'on the job'—it does not depend upon solely knowledge of previous cyber threat attacks. The Artificial Intelligence models and classifiers combine use of unsupervised and supervised machine learning constantly revises assumptions about behavior, using probabilistic mathematics, that is always up to date on what a current normal behavior is, and not solely reliant on human input. The Artificial Intelligence models and classifiers combine use of unsupervised and supervised machine learning on cyber security is capable of seeing hitherto undiscovered cyber events, from a variety of threat sources, which would otherwise have gone unnoticed.

Next, these cyber threats can include, for example: Insider threat—malicious or accidental, Zero-day attacks—previously unseen, novel exploits, latent vulnerabilities, machine-speed attacks—ransomware and other automated attacks that propagate and/or mutate very quickly, Cloud and SaaS-based attacks, other silent and stealthy attacks advance persistent threats, advanced spear-phishing, etc.

Ranking the Cyber Threat

The assessment module 125 and/or cyber threat analyst module 120 of FIG. 1 can cooperate with the AI model(s) 160 trained on possible cyber threats to use AI algorithms to account for ambiguities by distinguishing between the subtly differing levels of evidence that characterize network data. Instead of generating the simple binary outputs 'malicious' or 'benign,' the AI's mathematical algorithms produce outputs marked with differing degrees of potential threat. This enables users of the system to rank alerts and notifications to the enterprise security administrator in a rigorous manner, and prioritize those which most urgently require action. Meanwhile, it also assists to avoid the problem of numerous false positives associated with simply a rule-based approach.

More on the Operation of the Cyber Security Appliance 100

As discussed in more detail below, the analyzer module 115 and/or cyber threat analyst module 120 can cooperate with the one or more unsupervised AI (machine learning) model 160 trained on the normal pattern of life/normal behavior in order to perform anomaly detection against the actual normal pattern of life for that system to determine whether an anomaly (e.g., the identified abnormal behavior and/or suspicious activity) is malicious or benign. In the operation of the cyber security appliance 100, the emerging cyber threat can be previously unknown, but the emerging threat landscape data 170 representative of the emerging cyber threat shares enough (or does not share enough) in common with the traits from the AI models 160 trained on cyber threats to now be identified as malicious or benign. Note, if later confirmed as malicious, then the AI models 160 trained with machine learning on possible cyber threats can update their training. Likewise, as the cyber security appliance 100 continues to operate, then the one or more AI models trained on a normal pattern of life for each of the entities in the system can be updated and trained with unsupervised machine learning algorithms. The analyzer module 115 can use any number of data analysis processes (discussed more in detail below and including the agent analyzer data analysis process here) to help obtain system data points so that this data can be fed and compared to the one or more AI models trained on a normal pattern of life, as well as the one or more machine learning models trained on potential cyber threats, as well as create and store data points with the connection finger prints.

All of the above AI models 160 can continually learn and train with unsupervised machine learning algorithms on an ongoing basis when deployed in their system that the cyber security appliance 100 is protecting. Thus, learning and training on what is normal behavior for each user, each device, and the system overall and lowering a threshold of what is an anomaly.

Anomaly Detection/Deviations

Anomaly detection can discover unusual data points in your dataset. Anomaly can be a synonym for the word 'outlier.' Anomaly detection (or outlier detection) is the identification of rare items, events or observations which raise suspicions by differing significantly from the majority of the data. Anomalous activities can be linked to some kind of problems or rare events. Since there are tons of ways to induce a particular cyber-attack, it is very difficult to have information about all these attacks beforehand in a dataset. But, since the majority of the user activity and device activity in the system under analysis is normal, the system overtime captures almost all of the ways which indicate normal behavior. And from the inclusion-exclusion principle, if an activity under scrutiny does not give indications of normal activity, the self-learning AI model using unsupervised machine learning can predict with high confidence that the given activity is anomalous. The AI unsupervised learning model learns patterns from the features in the day to day dataset and detecting abnormal data which would not have fallen into the category (cluster) of normal behavior. The goal of the anomaly detection algorithm through the data fed to it is to learn the patterns of a normal activity so that when an anomalous activity occurs, the modules can flag the anomalies through the inclusion-exclusion principle. The goal of the anomaly detection algorithm through the data fed to it is to learn the patterns of a normal activity so that when an anomalous activity occurs, the modules can flag the anomalies through the inclusion-exclusion principle. The cyber threat module can perform its two level analysis on anomalous behavior and determine correlations.

In an example, 95% of data in a normal distribution lies within two standard-deviations from the mean. Since the likelihood of anomalies in general is very low, the modules cooperating with the AI model of normal behavior can say with high confidence that data points spread near the mean value are non-anomalous. And since the probability distribution values between mean and two standard-deviations are large enough, the modules cooperating with the AI model of normal behavior can set a value in this example range as a threshold (a parameter that can be tuned over time through the self-learning), where feature values with probability larger than this threshold indicate that the given feature's values are non-anomalous, otherwise it's anomalous. Note, this anomaly detection can determine that a data point is anomalous/non-anomalous on the basis of a particular feature. In reality, the cyber security appliance 100 should not flag a data point as an anomaly based on a single feature. Merely, when a combination of all the probability values for all features for a given data point is calculated, the modules cooperating with the AI model of normal behavior can say with high confidence whether a data point is an anomaly or not.

Again, the AI models trained on a normal pattern of life of entities in a network (e.g., domain) under analysis may perform the cyber threat detection through a probabilistic change in a normal behavior through the application of, for example, an unsupervised Bayesian mathematical model to detect the behavioral change in computers and computer networks. The Bayesian probabilistic approach can determine periodicity in multiple time series data and identify changes across single and multiple time series data for the purpose of anomalous behavior detection. Please reference U.S. Pat. No. 10,701,093 granted Jun. 30, 2020, titled "Anomaly alert system for cyber threat detection" for an example Bayesian probabilistic approach, which is incorporated by reference in its entirety. In addition, please reference US patent publication number "US2021273958A1 filed Feb. 26, 2021, titled "Multi-stage anomaly detection for process chains in multi-host environments" for another example anomalous behavior detector using a recurrent neural network and a bidirectional long short-term memory (LSTM), which is incorporated by reference in its entirety. In addition, please reference US patent publication number "US2020244673A1, filed Apr. 23, 2019, titled "Multivariate network structure anomaly detector," which is incorporated by reference in its entirety, for another example anomalous behavior detector with a Multivariate Network and Artificial Intelligence classifiers.

Next, as discussed further below, during pre-deployment the cyber threat analyst module 120 and the analyzer module 115 can use data analysis processes and cooperate with AI model(s) 160 trained on forming and investigating hypotheses on what are a possible set of cyber threats. In addition, another set of AI models can be trained on how to form and investigate hypotheses on what are a possible set of cyber threats and steps to take in supporting or refuting hypotheses. The AI models trained on forming and investigating hypotheses are updated with unsupervised machine learning algorithms when correctly supporting or refuting the hypotheses including what additional collected data proved to be the most useful.

Similarly, during deployment, the data analysis processes (discussed herein) used by the analyzer module 115 can use unsupervised machine learning to update the initial training learned during pre-deployment, and then update the training with unsupervised learning algorithms during the cyber security appliance's 100 deployment in the system being protected when various different steps to either i) support or ii) refute the possible set of cyber threats hypotheses worked better or worked worse.

The AI model(s) 160 trained on a normal pattern of life of entities in a domain under analysis may perform the threat detection through a probabilistic change in a normal behavior through the application of, for example, an unsupervised Bayesian mathematical model to detect a behavioral change in computers and computer networks. The Bayesian probabilistic approach can determine periodicity in multiple time series data and identify changes across single and multiple time series data for the purpose of anomalous behavior detection. In an example, a system being protected can include both email and IT network domains under analysis. Thus, email and IT network raw sources of data can be examined along with a large number of derived metrics that each produce time series data for the given metric.

Examples of domains/networks under analysis being protected can include any of i) an Informational Technology network, ii) an Operational Technology network, iii) a Cloud service, iv) a SaaS service, v) an endpoint device, vi) an email domain, and vii) any combinations of these. A domain module is constructed and coded to interact with and understand a specific domain.

For instance, the first domain module 145 may operate as an IT network module configured to receive information from and send information to, in this example, IT network-based sensors (i.e., probes, taps, etc.). The first domain module 145 also has algorithms and components configured to understand, in this example, IT network parameters, IT network protocols, IT network activity, and other IT network characteristics of the network under analysis. The second domain module 150 is, in this example, an email module. The second domain module 150 can be an email network module configured to receive information from and send information to, in this example, email-based sensors (i.e., probes, taps, etc.). The second domain module 150 also has algorithms and components configured to understand, in this example, email parameters, email protocols and formats, email activity, and other email characteristics of the network under analysis. Additional domain modules can also collect domain data from another respective domain.

The coordinator module 155 is configured to work with various machine learning algorithms and relational mechanisms to i) assess, ii) annotate, and/or iii) position in a vector diagram, a directed graph, a relational database, etc., activity including events occurring, for example, in the first domain compared to activity including events occurring in the second domain. The domain modules can cooperate to exchange and store their information with the data store.

The process identifier classifier (not shown) in the gather module 110 can cooperate with additional classifiers in each of the domain modules 145/150 to assist in tracking individual processes and associating them with entities in a domain under analysis as well as individual processes and how they relate to each other. The process identifier classifier can cooperate with other trained AI classifiers in the modules to supply useful metadata along with helping to make logical nexuses.

A feedback loop of cooperation exists between the gather module 110, the analyzer module 115, AI model(s) 160 trained on different aspects of this process, and the cyber threat analyst module 120 to gather information to determine whether a cyber threat is potentially attacking the networks/domains under analysis.

Determination of Whether Something is Likely Malicious

In the following examples the analyzer module 115 and/or cyber threat analyst module 120 can use multiple factors to the determination of whether a process, event, object, entity, etc. is likely malicious.

In an example, the analyzer module 115 and/or cyber threat analyst module 120 can cooperate with one or more of the AI model(s) 160 trained on certain cyber threats to detect whether the anomalous activity detected, such as suspicious email messages, exhibit traits that may suggest a malicious intent, such as phishing links, scam language, sent from suspicious domains, etc. The analyzer module 115 and/or cyber threat analyst module 120 can also cooperate with one of more of the AI model(s) 160 trained on potential IT based cyber threats to detect whether the anomalous activity detected, such as suspicious IT links, URLs, domains, user activity, etc., may suggest a malicious intent as indicated by the AI models trained on potential IT based cyber threats.

In the above example, the analyzer module 115 and/or the cyber threat analyst module 120 can cooperate with the one or more AI models 160 trained with machine learning on the normal pattern of life for entities in an email domain under analysis to detect, in this example, anomalous emails which are detected as outside of the usual pattern of life for each entity, such as a user, email server, etc., of the email network/domain. Likewise, the analyzer module 115 and/or the cyber threat analyst module 120 can cooperate with the one or more AI models trained with machine learning on the normal pattern of life for entities in a second domain under analysis (in this example, an IT network) to detect, in this example, anomalous network activity by user and/or devices in the network, which is detected as outside of the usual pattern of life (e.g. abnormal) for each entity, such as a user or a device, of the second domain's network under analysis.

Thus, the analyzer module 115 and/or the cyber threat analyst module 120 can be configured with one or more data analysis processes to cooperate with the one or more of the AI model(s) 160 trained with machine learning on the normal pattern of life in the system, to identify an anomaly of at least one of i) the abnormal behavior, ii) the suspicious activity, and iii) the combination of both, from one or more entities in the system. Note, other sources, such as other model breaches, can also identify at least one of i) the abnormal behavior, ii) the suspicious activity, and iii) the combination of both to trigger the investigation.

Accordingly, during this cyber threat determination process, the analyzer module 115 and/or the cyber threat analyst module 120 can also use AI classifiers that look at the features and determine a potential maliciousness based on commonality or overlap with known characteristics of malicious processes/entities. Many factors including anomalies that include unusual and suspicious behavior, and other indicators of processes and events are examined by the one or more AI models 160 trained on potential cyber threats and/or the AI classifiers looking at specific features for their malicious nature in order to make a determination of whether an individual factor and/or whether a chain of anomalies is determined to be likely malicious.

Initially, in this example of activity in an IT network analysis, the rare JA3 hash and/or rare user agent connections for this network coming from a new or unusual process are factored just like in the first wireless domain suspicious wireless signals are considered. These are quickly determined by referencing the one or more of the AI model(s) 160 trained with machine learning on the pattern of life of each device and its associated processes in the system. Next, the analyzer module 115 and/or the cyber threat analyst module 120 can have an external input to ingest threat intelligence from other devices in the network cooperating with the cyber security appliance 100. Next, the analyzer module 115 and/or the cyber threat analyst module 120 can look for other anomalies, such as model breaches, while the AI models trained on potential cyber threats can assist in examining and factoring other anomalies that have occurred over a given timeframe to see if a correlation exists between a series of two or more anomalies occurring within that time frame.

The analyzer module 115 and/or the cyber threat analyst module 120 can combine these Indicators of Compromise (e.g., unusual network JA3, unusual device JA3, . . . ) with many other weak indicators to detect the earliest signs of an emerging threat, including previously unknown threats, without using strict blacklists or hard-coded thresholds. However, the AI classifiers can also routinely look at blacklists, etc. to identify maliciousness of features looked at.

Another example of features may include a deeper analysis of endpoint data. This endpoint data may include domain metadata, which can reveal peculiarities such as one or more indicators of potentially a malicious domain (i.e., its URL). The deeper analysis may assist in confirming an analysis to determine that indeed a cyber threat has been detected. The analyzer module 115 can also look at factors of how rare the endpoint connection is, how old the endpoint is, where geographically the endpoint is located, how a security certificate associated with a communication is verified only by an endpoint device or by an external 3rd party, just to name a few additional factors. The analyzer module 115 (and similarly the cyber threat analyst module 120) can then assign weighting given to these factors in the machine learning that can be supervised based on how strongly that characteristic has been found to match up to actual malicious sites in the training.

In another AI classifier to find potentially malicious indicators, the agent analyzer data analysis process in the analyzer module 115 and/or cyber threat analyst module 120 may cooperate with the process identifier classifier to identify all of the additional factors of i) are one or more processes running independently of other processes, ii) are the one or more processes running independent are recent to this network, and iii) are the one or more processes running independent connect to the endpoint, which the endpoint is a rare connection for this network, which are referenced and compared to one or more AI models trained with machine learning on the normal behavior of the pattern of life of the system.

Note, a user agent, such as a browser, can act as a client in a network protocol used in communications within a client-server distributed computing system. In particular, the Hypertext Transfer Protocol (HTTP) identifies the client software originating (an example user agent) the request, using a user-agent header, even when the client is not operated by a user. Note, this identification can be faked, so it is only a weak indicator of the software on its own, but when compared to other observed user agents on the device, this can be used to identify possible software processes responsible for requests.

The analyzer module 115 and/or the cyber threat analyst module 120 may use the agent analyzer data analysis process that detects a potentially malicious agent previously unknown to the system to start an investigation on one or more possible cyber threat hypotheses. The determination and output of this step is what are possible cyber threats that can include or be indicated by the identified abnormal behavior and/or identified suspicious activity identified by the agent analyzer data analysis process.

In an example, the cyber threat analyst module 120 can use the agent analyzer data analysis process and the AI models(s) trained on forming and investigating hypotheses on what are a possible set of cyber threats to use the machine learning and/or set scripts to aid in forming one or more hypotheses to support or refute each hypothesis. The cyber threat analyst module 120 can cooperate with the AI models trained on forming and investigating hypotheses to form an initial set of possible hypotheses, which needs to be intelligently filtered down. The cyber threat analyst module 120 can be configured to use the one or more supervised machine learning models trained on i) agnostic examples of a past history of detection of a multitude of possible types of cyber threat hypotheses previously analyzed by human, who was a cyber security professional, ii) a behavior and input of how a plurality of human cyber security analysts make a decision and analyze a risk level regarding and a probability of a potential cyber threat, iii) steps to take to conduct an investigation start with anomaly via learning how expert humans tackle investigations into specific real and synthesized cyber threats and then the steps taken by the human cyber security professional to narrow down and identify a potential cyber threat, and iv) what type of data and metrics that were helpful to further support or refute each of the types of cyber threats, in order to determine a likelihood of whether the abnormal behavior and/or suspicious activity is either i) malicious or ii) benign?

The cyber threat analyst module 120 using AI models, scripts and/or rules based modules is configured to conduct initial investigations regarding the anomaly of interest, collected additional information to form a chain of potentially related/linked information under analysis and then form one or more hypotheses that could have this chain of information that is potentially related/linked under analysis and then gather additional information in order to refute or support each of the one or more hypotheses.

In an example, a behavioral pattern analysis for identifying what are the unusual behaviors of the network/system/device/user under analysis by the AI (machine learning) models may be as follows. The coordinator module 155 can tie the alerts, activities, and events from, in this example, the email domain to the alerts, activities, and events from the IT network domain. As shown in FIG. 10, a graph 1000 of an embodiment of an example chain of unusual behavior for, in this example, the email activities as well as IT activities deviating from a normal pattern of life for this user and/or device in connection with the rest of the system/network under analysis. The cyber threat analyst module 120 and/or analyzer module 115 can cooperate with one or more AI (machine learning) models. The one or more AI (machine learning) models are trained and otherwise configured with mathematical algorithms to infer, for the cyber-threat analysis, 'what is possibly happening with the chain of distinct alerts, activities, and/or events, which came from the unusual pattern,' and then assign a threat risk associated with that distinct item of the chain of alerts and/or events forming the unusual pattern. The unusual pattern can be determined by examining initially what activities/events/alerts that do not fall within the window of what is the normal pattern of life for that network/system/device/user under analysis can be analyzed to determine whether that activity is unusual or suspicious. A chain of related activity that can include both unusual activity and activity within a pattern of normal life for that entity can be formed and checked against individual cyber threat hypothesis to determine whether that pattern is indicative of a behavior of a malicious actor—human, program, or other threat. The cyber threat analyst module 120 can go back and pull in some of the normal activities to help support or refute a possible hypothesis of whether that pattern is indicative of a behavior of a malicious actor. An illustrative example of a behavioral pattern included in the chain is shown in the graph over a time frame of, an example, 7 days. The cyber threat analyst module 120 detects a chain of anomalous behavior of unusual data transfers three times, unusual characteristics in email messages in the monitored system three times which seem to have some causal link to the unusual data transfers. Likewise, twice unusual credentials attempted the unusual behavior of trying to gain access to sensitive areas or malicious IP addresses and the user associated with the unusual credentials trying unusual behavior has a causal link to at least one of those three email messages with unusual characteristics. Again, the cyber security appliance 100 can go back and pull in some of the normal activities to help support or refute a possible hypothesis of whether that pattern is indicative of a behavior of a malicious actor. The analyzer module 115 of FIG. 1 can cooperate with one or more models trained on cyber threats and their behavior to try to determine if a potential cyber threat is causing these unusual behaviors. The cyber threat analyst module 120 can put data and entities into 1) a directed graph and nodes in that graph that are overlapping or close in distance have a good possibility of being related in some manner, 2) a vector diagram, 3) relational database, and 4) other relational techniques that will at least be examined to assist in creating the chain of related activity connected by causal links, such as similar time, similar entity and/or type of entity involved, similar activity, etc., under analysis. If the pattern of behaviors under analysis is believed to be indicative of a malicious actor, then a score of how confident is the system in this assessment of identifying whether the unusual pattern was caused by a malicious actor is created. Next, also assigned is a threat level score or probability indicative of what level of threat does this malicious actor pose. Lastly, the cyber security appliance 100 is configurable in a user interface, by a user, enabling what type of automatic response actions, if any, the cyber security appliance 100 may take when different types of cyber threats, indicated by the pattern of behaviors under analysis, that are equal to or above a configurable level of threat posed by this malicious actor.

Referring still to FIG. 1, The autonomous response module 140 is configured to take one or more autonomous mitigation actions to mitigate the cyber threat during the cyberattack by the cyber threat. The autonomous response module 140 can reference an AI model trained to track a normal pattern of life for each node of the protected system to perform an autonomous act of, for example, restricting a potentially compromised node having i) an actual indication of compromise and/or ii) merely adjacent to a known compromised node, to merely take actions that are within that node's normal pattern of life to mitigate the cyber threat. Similarly named components in the cyber security restoration engine can operate and function similar to as described for the detection engine.

The chain of the individual alerts, activities, and events that form the pattern including one or more unusual or suspicious activities into a distinct item for cyber-threat analysis of that chain of distinct alerts, activities, and/or events. The cyber-threat module may reference the one or more machine learning models trained on, in this example, e-mail threats to identify similar characteristics from the individual alerts and/or events forming the distinct item made up of the chain of alerts and/or events forming the unusual pattern.

An Assessment of the Cyber Threat in Order to Determine Appropriate Autonomous Actions, for Example, Those by the Autonomous Response Engine In the next step, the analyzer module 115 and/or cyber threat analyst module 120 generates one or more supported possible cyber threat hypotheses from the possible set of cyber threat hypotheses. The analyzer module 115 generates the supporting data and details of why each individual hypothesis is supported or not. The analyzer module 115 can also generate one or more possible cyber threat hypotheses and the supporting data and details of why they were refuted.

In general, the analyzer module 115 cooperates with the following three sources. The analyzer module 115 cooperates with the one or more of the AI model(s) 160 trained on cyber threats to determine whether an anomaly such as the abnormal behavior and/or suspicious activity is either 1) malicious or 2) benign when the potential cyber threat under analysis is previously unknown to the cyber security appliance 100. The analyzer module 115 cooperates with one or more of the AI model(s) 160 trained on a normal behavior of entities in the network under analysis. The analyzer module 115 cooperates with various AI-trained classifiers. With all of these sources, when they input information that indicates a potential cyber threat that is i) severe enough to cause real harm to the network under analysis and/or ii) a close match to known cyber threats, then the analyzer module can make a final determination to confirm that a cyber threat likely exists and send that cyber threat to the assessment module to assess the threat score associated with that cyber threat. Certain model breaches will always trigger a potential cyber threat that the analyzer will compare and confirm the cyber threat.

In the next step, the assessment module 125 with the AI classifiers is configured to cooperate with the analyzer module 115. The analyzer module 115 supplies the identity of the supported possible cyber threat hypotheses from the possible set of cyber threat hypotheses to the assessment module 125. The assessment module 125 with the AI classifiers cooperates with the one or more of the AI model(s) 160 trained on possible cyber threats can make a determination on whether a cyber threat exists and what level of severity is associated with that cyber threat. The assessment module 125 with the AI classifiers cooperates with one or more of the AI model(s) 160 trained on possible cyber threats in order assign a numerical assessment of a given cyber threat hypothesis that was found likely to be supported by the analyzer module 115 with the one or more data analysis processes, via the abnormal behavior, the suspicious activity, or the collection of system data points. The assessment module 125 with the AI classifiers output can be a score (ranked number system, probability, etc.) that a given identified process is likely a malicious process.

The assessment module 125 with the AI classifiers can be configured to assign a numerical assessment, such as a probability, of a given cyber threat hypothesis that is supported and a threat level posed by that cyber threat hypothesis which was found likely to be supported by the analyzer module 115, which includes the abnormal behavior or suspicious activity as well as one or more of the collection of system data points, with the one or more AI models trained on possible cyber threats.

The cyber threat analyst module 120 in the AI-based cyber security appliance 100 component provides an advantage over competitors' products as it reduces the time taken for cyber security investigations, provides an alternative to workforce for small organizations and improves detection (and remediation) capabilities within the cyber security appliance 100. The AI-based, cyber threat analyst module 120 performs its own computation of threat and identifies interesting network events with one or more processers. These methods of detection and identification of threat all add to the above capabilities that make the cyber threat analyst module 120 a desirable part of the cyber security appliance 100. The cyber threat analyst module 120 offers a method of prioritizing which is not just a summary or highest score alert of an event evaluated by itself equals the worst and prevents more complex attacks being missed because their composite parts/individual threats only produced low-level alerts.

The AI classifiers can be part of the assessment module 125, which scores the outputs of the analyzer module 115. Again, as for the other AI classifiers discussed, the AI classifier can be coded to take in multiple pieces of information about an entity, object, and/or thing and based on its training and then output a prediction about the entity, object, or thing. Given one or more inputs, the AI classifier model will try to predict the value of one or more outcomes. The AI classifiers cooperate with the range of data analysis processes that produce features for the AI classifiers. The various techniques cooperating here allow anomaly detection and assessment of a cyber threat level posed by a given anomaly; but more importantly, an overall cyber threat level posed by a series/chain of correlated anomalies under analysis.

In the next step, the formatting module 130 can generate an output such as a printed or electronic report with the relevant data. The formatting module 130 can cooperate with both the analyzer module 115 and the assessment module 125 depending on what the user wants to be reported.

The formatting module 130 is configured to format, present a rank for, and output one or more supported possible cyber threat hypotheses from the assessment module into a formalized report, from a one or more report templates populated with the data for that incident.

The formatting module 130 is configured to format, present a rank for, and output one or more detected cyber threats from the analyzer module or from the assessment module into a formalized report, from a one or more report templates populated with the data for that incident. Many different types of formalized report templates exist to be populated with data and can be outputted in an easily understandable format for a human user's consumption.

The formalized report on the template is outputted for a human user's consumption in a medium of any of 1) printable report, 2) presented digitally on a user interface, 3) in a machine-readable format for further use in machine-learning reinforcement and refinement, or 4) any combination of the three. The formatting module 130 is further configured to generate a textual write up of an incident report in the formalized report for a wide range of breaches of normal behavior, used by the AI models trained with machine learning on the normal behavior of the system, based on analyzing previous reports with one or more models trained with machine learning on assessing and populating relevant data into the incident report corresponding to each possible cyber threat. The formatting module 130 can generate a threat incident report in the formalized report from a multitude of a dynamic human-supplied and/or machine created templates corresponding to different types of cyber threats, each template corresponding to different types of cyber threats that vary in format, style, and standard fields in the multitude of templates. The formatting module 130 can populate a given template with relevant data, graphs, or other information as appropriate in various specified fields, along with a ranking of a likelihood of whether that hypothesis cyber threat is supported and its threat severity level for each of the supported cyber threat hypotheses, and then output the formatted threat incident report with the ranking of each supported cyber threat hypothesis, which is presented digitally on the user interface and/or printed as the printable report.

In the next step, the assessment module 125 with the AI classifiers, once armed with the knowledge that malicious activity is likely occurring/is associated with a given process from the analyzer module 115, then cooperates with the autonomous response module 140 to take an autonomous action such as i) deny access in or out of the device or the network ii) shutdown activities involving a detected malicious agent, iii) restrict devices and/or user's to merely operate within their particular normal pattern of life, iv) remove some user privileges/permissions associated with the compromised user account, etc.

The autonomous response module 140, rather than a human taking an action, can be configured to cause one or more rapid autonomous actions in response to be taken to counter the cyber threat. A user interface for the response module can program the autonomous response module 140 i) to merely make a suggested response to take to counter the cyber threat that will be presented on a display screen and/or sent by a notice to an enterprise security administrator for explicit authorization when the cyber threat is detected or ii) to autonomously take a response to counter the cyber threat without a need for a human to approve the response when the cyber threat is detected. The autonomous response module 140 will then send a notice of the autonomous response as well as display the autonomous response taken on the display screen. Example autonomous responses may include cut off connections, shutdown devices, change the privileges of users, delete, and remove malicious links in emails, slow down a transfer rate, cooperate with other security devices such as a firewall to trigger its autonomous actions, and other autonomous actions against the devices and/or users. The autonomous response module 140 uses one or more of the AI model(s) 160 that are configured to intelligently work with other third-party defense systems in that customer's network against threats. The autonomous response module 140 can send its own protocol commands to devices and/or take actions on its own. In addition, the autonomous response module 140 uses the one or more of the AI model(s) 160 to orchestrate with other third-party defense systems to create a unified defense response against a detected threat within or external to that customer's network. The autonomous response module 140 can be an autonomous self-learning digital response coordinator that is trained specifically to control and reconfigure the actions of traditional legacy computer defenses (e.g., firewalls, switches, proxy servers, etc.) to contain threats propagated by, or enabled by, networks and the internet. The cyber threat analyst module 120 and/or assessment module 125 can cooperate with the autonomous response module 140 to cause one or more autonomous actions in response to be taken to counter the cyber threat, improves computing devices in the system by limiting an impact of the cyber threat from consuming unauthorized CPU cycles, memory space, and power consumption in the computing devices via responding to the cyber threat without waiting for some human intervention.

The trigger module 105, analyzer module 115, assessment module 125, the cyber threat analyst module 120, and formatting module 130 cooperate to improve the analysis and formalized report generation with less repetition to consume CPU cycles with greater efficiency than humans repetitively going through these steps and re-duplicating steps to filter and rank the one or more supported possible cyber threat hypotheses from the possible set of cyber threat hypotheses.

Referring to FIG. 1, the autonomous response module is configured to use one or more Application Programming Interfaces to translate desired mitigation actions for nodes (devices, user accounts, etc.) into a specific language and syntax utilized by that device, user account, etc. from potentially multiple different vendors being protected in order to send the commands and other information to cause the desired mitigation actions to change, for example, a behavior of a detected threat of a user and/or a device acting abnormal to the normal pattern of life. The selected mitigation actions on the selected nodes minimize an impact on other parts of the system being protected (e.g., devices and users) that are i) currently active in the system being protected and ii) that are not in breach of being outside the normal behavior benchmark. The autonomous response engine can have a discovery module to i) discover capabilities of each node being protected device and the other cyber security devices (e.g. firewalls) in the system being protected and ii) discover mitigation actions they can take to counter and/or contain the detected threat to the system being protected, as well as iii) discover the communications needed to initiate those mitigation actions.

For example, the autonomous response engine cooperates and coordinates with an example set of network capabilities of various network devices. The network devices may have various capabilities such as identity management including setting user permissions, network security controls, firewalls denying or granting access to various ports, encryption capabilities, centralize logging, antivirus anti-malware software quarantine and immunization, patch management, etc., and also freeze any similar, for example, network activity, etc. triggering the harmful activity on the system being protected.

Accordingly, the autonomous response engine will take an autonomous mitigation action to, for example, shutdown the device or user account, block login failures, perform file modifications, block network connections, restrict the transmission of certain types of data, restrict a data transmission rate, remove, or restrict user permissions, etc. The autonomous response engine for an email system could initiate example mitigation actions to either remedy or neutralize the tracking link, when determined to be the suspicious covert tracking link, while not stopping every email entering the email domain with a tracking link, or hold the email communication entirely if the covert tracking link is highly suspicious, and also freeze any similar, for example, email activity triggering the harmful activity on the system being protected.

The autonomous response engine has a default set of autonomous mitigation actions shown on its user interface that it knows how to perform when the different types of cyber threats are equal to or above a user configurable threshold posed by this type of cyber threat. The autonomous response engine is also configurable in its user interface to allow the user to augment and change what type of automatic mitigation actions, if any, the autonomous response engine may take when different types of cyber threats that are equal to or above the configurable level of threat posed by a cyber threat.

The autonomous response engine can also reference its artificial intelligence trained to perform mitigation actions. Again, the autonomous response engine has an administrative tool in its user interface to program/set what autonomous mitigation actions the autonomous response engine can take, including types of mitigation actions and specific mitigation actions the autonomous response engine is capable of, when the cyber-threat module in the detection engine indicates the threat risk parameter is equal to or above the actionable threshold, selectable by the cyber professional. The cyber professional can also indicate what types of mitigation actions can be performed for different users and parts of the system as well as what actions need the cyber professional to approve. Again, the autonomous response engine can also reference a default library of mitigation actions, types of mitigation actions and specific mitigation actions the autonomous response engine is capable of on a particular node.

FIG. 8 illustrates a block diagram of an embodiment of a security platform 800 including the AI-based cyber security appliance 100. The cyber security appliance 100 is part of an enterprise network 830, which may further include one or more computing devices such as database servers 850, web servers 860, networking devices (e.g., bridge, switch, router, load-balancers, gateways, and/or firewalls), endpoint devices with connectivity to resources within the enterprise network 830 as well as a publicly accessible network 880 (e.g., the Internet). The endpoint devices 870 may include, but are not limited or restricted to desktop computers, laptops, smart phones, tablets, wearables, smart appliances, or the like. The security controls operate as probes and detectors that are configured to monitor, for example, network-based activity (e.g., email activity, TCP/IP communications, text or Short Message Service (SMS) activity, etc.) and computing device activity (e.g., download activity based on volume, day, time of day, etc.); credential update/modification activity (e.g., credential changes, failed access attempts to a resource, etc.); and/or resource activity (e.g., attempted/successful accesses to enterprise resources, etc.). The security controls provide the monitored data (or a version of the monitored data) as input into the modules of the cyber security appliance 100 to determine what is occurring in each domain individually. In an example, the probes and detectors may monitor email activity and IT network activity to feed this data to determine what is occurring in each domain individually to their respective modules configured and trained to understand that domain's information as well as correlate causal links between these activities in these domains to supply this input into the modules of the cyber security appliance 100. The network can include various computing devices such as desktop units, laptop units, smart phones, firewalls, network switches, routers, servers, databases, Internet gateways, etc.

Prediction Engine and Restoration Engine

Overall, the cyber security appliance 100 and its modules use Artificial Intelligence algorithms configured and trained to perform a first machine-learned task of detecting the cyber threat as well as the autonomous response module 140 can use a combination of user configurable settings on actions to take to mitigate a detected cyber threat, a default set of actions to take to mitigate a detected cyber threat, and Artificial Intelligence algorithms configured and trained to perform a second machine-learned task of taking one or more mitigation actions to mitigate the cyber threat. A cyber security restoration engine accessible via restoration engine interface 190 deployed in the cyber security appliance 100 uses Artificial Intelligence algorithms configured and trained to perform a third machine-learned task of remediating the system/network being protected back to a trusted operational state. The prediction engine 900 of FIG. 9, and referenced by FIG. 1, uses Artificial Intelligence algorithms configured and trained to perform a fourth machine-learned task of Artificial Intelligence-based simulations of cyberattacks to assist in determining 1) how a simulated cyberattack might occur in the system being protected, and 2) how to use the simulated cyberattack information to preempt possible escalations of an ongoing actual cyberattack.

Referring now to FIG. 9, an exemplary block diagram of an embodiment of an AI-based cyber security system including a prediction engine 900 is shown. The prediction engine 900 conducts Artificial Intelligence-based simulations by constructing a graph of nodes of the system being protected (e.g., a network including (a) the physical devices connecting to the network, any virtualized instances of the network, user accounts in the network, email accounts in the network, etc. as well as (b) connections and pathways through the network) to create a virtualized instance of the network to be tested. As shown in FIG. 9, the various cooperating modules residing in the prediction engine 900 may include, but are not limited to, a collections module 905, a cyberattack generator (e.g. phishing email generator) 910, an email module 915, a network module 920, an analyzer module 925, a payloads module 930 with first and second payloads, a communication module 935, a training module 940, a simulated attack module 950, a cleanup module 955, a scenario module 960, a user interface 965, a reporting module 970, a formatting module 975, an orchestration module 980, and/or an AI classifier 985 with a list of specified classifiers.

The simulated attack module 950 in the prediction engine 900 may be implemented via i) a simulator to model the system being protected and/or ii) a clone creator to spin up a virtual network and create a virtual clone of the system being protected configured to pen-test one or more defenses provided by the cyber security appliance 100. The prediction engine 900 may include and cooperate with one or more AI models 987 trained with machine learning on the contextual knowledge of the organization, such as those in the cyber security appliance 100 or have its own separate model trained with machine learning on the contextual knowledge of the organization and each user's and device's normal pattern of behavior. These trained AI models 987 may be configured to identify data points from the contextual knowledge of the organization and its entities, which may include, but is not limited to, language-based data, email/network connectivity and behavior pattern data, and/or historic knowledgebase data. The prediction engine 900 may use the trained AI models 787 to cooperate with one or more AI classifier(s) 985 by producing a list of specific organization-based classifiers for the AI classifier(s) 985.

The simulated attack module 950 by cooperating with the other modules in the prediction engine 900 is further configured to calculate and run one or more hypothetical simulations of a possible cyberattack and/or of an actual ongoing cyberattack from a cyber threat through an attack pathway through the system being protected. The prediction engine 900 is further configured to calculate, based at least in part on the results of the one or more hypothetical simulations of a possible cyberattack and/or of an actual ongoing cyberattack from a cyber threat through an attack pathway through the system being protected, a risk score for each node (e.g. each device, user account, etc.), the threat risk score being indicative of a possible severity of the compromise and/or chance of compromise prior to an autonomous response action is taken in response to an actual cyberattack of the cyber incident.

The simulated attack module 950 is configured to initially create the network being protected in a simulated or virtual device environment. Additionally, the orchestration module 980 and communications module 935 may be configured to cooperate with the cyber security appliance 100 to securely obtain specific data about specific users, devices, and entities in specific networks of for this specific organization. The training module 940 and simulated attack module 950 in the prediction engine 900 use the obtained specific data to generate one or more specific cyberattacks, such as a phishing email, tailored to those specific users, devices, and/or entities of the specific organization. Many different cyberattacks can be simulated by the AI red team module but a phishing email attack will be used as an example cyberattack.

The prediction engine 900 is communicatively coupled to the cyber security appliance 100, an open source (OS) database server 990, an email system 991 with one or more endpoint computing devices 991A-B, and a network system 992 with one or more entities 993-999, and a restoration engine 945 over one or more networks 946/947. The cyber security appliance 100 may cooperate with the prediction engine 900 to initiate a pen-test in the form of, for example, a software attack, which generates a customized, for example, phishing email to spoof one or more specific users/devices/entities of an organization in an email/network defense system and then looks for any security vulnerabilities, risks, threats, and/or weaknesses potentially gaining access to one or more features and data of that specific user/device/entity.

The prediction engine 900 may be customized and/or driven by a centralized AI using and/or modelling a smart awareness of a variety of specific historical email/network behavior patterns and communications of a specific organization's hierarchy within a specific organization. Such AI modelling may be trained and derived through machine learning and the understanding of the organization itself based on: (i) a variety of OS materials such as any OS materials collected from the OS database server 990 and (ii) its historical awareness of any specific email/network connectivity and behavior patterns to target for that organization as part of an offensive (or attacking) security approach. The training module 940 can contain for reference a database of cyberattack scenarios as well as restoration response scenarios by the restoration engine 945 stored in the database.

The prediction engine 900 may use the orchestration module 980 to implement and orchestrate this offensive approach all the way from an initial social engineering attack at an earlier stage of the pentest to a subsequent payload delivery attack at a later stage of the pentest and so on. The prediction engine 900 is configured to: (i) intelligently initiate a customized cyberattack on the components, for example, in the IT network and email system 991; as well as (ii) subsequently generating a report to highlight and/or raise awareness of one or more key areas of vulnerabilities and/or risks for that organization after observing the intelligently initiated attack (e.g., such key areas may be formatted and reported in a way tailored for that organization using both the formatting and reporting modules, as described below); and (iii) then allow that enterprise (e.g., organization) to be trained on that attack and its impact on those specific security postures, thereby allowing that organization to go in directly to mitigate and improve those compromised security postures going forward, as well as iv) during an actual cyberattack, obtain and ingest data known on the cyberattack, run simulations, and then supply information, for example, to the autonomous response module in the cyber security appliance to mitigate the actual cyberattack.

The prediction engine 900 may cooperate with the cyber security appliance 100 to provide feedback on any successful attacks and detections. For example, in the event that the prediction engine 900 is successful in pentesting any of the organization's entities in the email and network defense systems 991/992, the prediction engine 900 may be configured to at least provide the cyber security appliance 100 (and/or any other predetermined entities) with any feedback on the successful pentest as well as any specifics regarding the processes uses for that successful pentest, such as providing feedback on the specific attack vectors, scenarios, targeted entities, characteristics of the customized phishing emails, payloads, and contextual data, etc., that were used.

The simulated attack module 950 in the prediction engine 900 may be configured with an attack path modeling component (not shown), which is programmed to work out the key paths and devices in a network via running cyberattacks on a simulated or virtual device version of the network under analysis incorporating metrics that feed into that modeling by running simulated cyberattacks on the particulars known about this specific network being protected by the cyber security appliance 100. The attack modeling has been programmed with the knowledge of a layout and connection pattern of each particular network device in a network and a number of connections and/or hops to other network devices in the network. Also, how important a particular device (a key importance) can be determined by the function of that network device, the user(s) associated with that network device, the location of the device within the network and a number of connections and/or hops to other important devices in the network. The attack path modeling component ingests the information for the purposes of modeling and simulating a potential attack against the network and routes that an attacker would take through the network. The attack path modeling component can be constructed with information to i) understand an importance of network nodes in the network compared to other network nodes in the network, and ii) to determine key pathways within the network and vulnerable network nodes in the network that a cyberattack would use during the cyberattack, via modeling the cyberattack on at least one of 1) a simulated device version and 2) a virtual device version of the network under analysis.

The prediction engine 900 plots the attack path through the nodes and estimated times to reach critical nodes in the network. The cyberattack simulation modeling is run to identify the routes, difficulty, and time periods from certain entry notes to certain key servers.

The attack path modeling component in the simulated attack module 950 cooperating with the other modules in the prediction engine 900 are configured to determine the key pathways within the network and the vulnerable network nodes in the network that the cyberattack would use during the cyberattack, via the modeling of the cyberattack on at least one of 1) the simulated device version and 2) the virtual device version of the network under analysis via using the actual detected vulnerabilities of each network node, a predicted frequency of remediation of those vulnerabilities within a specific network device in the network without a notice from the restoration engine 945, and an importance of the key network nodes with the actual vulnerabilities compared to other network nodes in the network.

The modules essentially seed the attack path modeling component with weakness scores that provide current data, customized to each user account and/or network device, which then allows the artificial intelligence running the attack path simulation to choose entry network nodes into the network with more accuracy as well as plot the attack path through the nodes and estimated times to reach critical nodes in the network much more accurately based on the actual current operational condition of the many user accounts and network devices in the network. The attack simulation modeling can be run to identify the routes, difficulty, and time periods from certain entry notes to certain key servers.

Note, the cyber threat analyst module 120 in the cyber security appliance 100 of FIG. 1 as well as the prediction engine 900 of FIG. 9 may use any unusual, detected behavior deviating from the normal behavior and then build a sequence/chain of unusual behavior and the causal links between the sequence/chain of unusual behavior to detect any potential cyber threats. For example, as shown in FIG. 10, the cyber security appliance 100 and the prediction engine 900 may determine the unusual patterns by analyzing i) what activities/events/alerts that fall outside of the window of what is the normal pattern of life for that network/system/entity/device/user under analysis; and (ii) then pulling in and analyzing the pattern of the behavior of the activities/events/alerts that are in the normal pattern of life but also connect to the indictors for a possible cyberattack, to determine whether that pattern is indicative of a behavior of a malicious actor, such as a human, program, and/or any other cyber harmful threat.

The prediction engine 900 and its Artificial Intelligence-based simulations use artificial intelligence to cooperate with the restoration engine 945 to assist in choosing one or more remediation actions to perform on nodes affected by the cyberattack back to a trusted operational state while still mitigating the cyber threat during an ongoing cyberattack based on effects determined through the simulation of possible remediation actions to perform and their effects on the nodes making up the system being protected and preempt possible escalations of the cyberattack while restoring one or more nodes back to a trusted operational state. Thus, for example, the restoration engine 945 restores the one or more nodes in the protected system by cooperating with any of 1) an AI model trained to model a normal pattern of life for each node in the protected system, 2) an AI model trained on what are a possible set of cyber threats and their characteristics and symptoms to identify the cyber threat (e.g. malicious actor/device/file) that is causing a particular node to behave abnormally (e.g. malicious behavior) and fall outside of that node's normal pattern of life, and 3) the autonomous response module 140.

The restoration engine 945 can reference both i) a database of restoration response scenarios stored in the database and ii) a prediction engine 900 configured to run AI-based simulations and use the operational state of each node in the graph of the protected system during simulations of cyberattacks on the protected system to restore 1) each node compromised by the cyber threat and 2) promote protection of the corresponding nodes adjacent to a compromised node in the graph of the protected system.

The restoration engine 945 can prioritize among the one or more nodes to restore, which nodes to remediate and an order of the nodes to remediate, based on two or more factors including i) a dependency order needed for the recovery efforts, ii) an importance of a particular recovered node compared to other nodes in the system being protected, iii) a level of compromise of a particular node contemplated to be restored, iv) an urgency to recover that node compared to whether containment of the cyber threat was successful, v) a list of a most important things in the protected system to recover earliest, and vi) factoring in a result of a cyberattack simulation being run during the cyberattack by the prediction engine 900 to predict a likely result regarding the cyberattack when that node is restored.

An interactive response loop exists between the restoration engine 945, the cyber security appliance 100, and the prediction engine 700. The restoration engine 945, the cyber security appliance 100, and the prediction engine 900 can be configured to cooperate to combine an understanding of normal operations of the nodes making up the devices and users in the system being protected by the cyber security appliance 100, an understanding emerging cyber threats, an ability to contain those emerging cyber threats, and a restoration of the nodes of the system to heal the system with an adaptive feedback between the multiple AI-based engines in light of simulations of the cyberattack to predict what might occur in the nodes in the system based on the progression of the attack so far, mitigation actions taken to contain those emerging cyber threats and remediation actions taken to heal the nodes using the simulated cyberattack information. The multiple AI-based engines have communication hooks in between them to exchange a significant amount of behavioral metrics including data between the multiple AI-based engines to work in together to provide an overall cyber threat response.

The cyber security appliance 100 and its modules use Artificial Intelligence algorithms configured and trained to perform a first machine-learned task of detecting the cyber threat as well as the autonomous response module 140 can use a combination of user configurable settings on actions to take to mitigate a detected cyber threat, a default set of actions to take to mitigate a detected cyber threat, and Artificial Intelligence algorithms configured and trained to perform a second machine-learned task of taking one or more mitigation actions to mitigate the cyber threat. The restoration engine 945 uses Artificial Intelligence algorithms configured and trained to perform a third machine-learned task of remediating the system/network being protected back to a trusted operational state. The prediction engine 900 uses Artificial Intelligence algorithms configured and trained to perform a fourth machine-learned task of AI-based simulations of cyberattacks to assist in determining 1) how a simulated cyberattack might occur in the system being protected, and 2) how to use the simulated cyberattack information to preempt possible escalations of an ongoing actual cyberattack. In an example, the autonomous response module 140 uses its intelligence to cooperate with the prediction engine 900 and its AI-based simulations to choose and initiate an initial set of one or more mitigation actions indicated as a preferred targeted initial response to the detected cyber threat by autonomously initiating those mitigation actions to defend against the detected cyber threat, rather than a human taking an action.

FIG. 11 illustrates an example Artificial Intelligence based cyber security appliance 100 using a cyber threat analyst module 104 to protect an example network. The example network of computer systems 50 uses a cyber security appliance 100. The system depicted is a simplified illustration, which is provided for ease of explanation.

Referring to FIG. 11, an exemplary and generalized embodiment of a system (e.g., enterprise network) 50 featuring computer systems 10 and 40, where one or more of these computer systems 10 and/or 40 may deploy the AI-based, cyber security appliance 100 of FIG. 1 to protect the enterprise, is shown. Herein, The system 50 comprises a first computer system 10 within a building, which uses the threat detection system to detect and thereby attempt to prevent threats to computing devices within its bounds.

The first computer system 10 comprises three computing devices 1, 2, 3, a local server 4, and a multifunctional device (MFD) 5 that provides printing, scanning and facsimile functionalities to each of the computers 1, 2, 3. All of the devices within the first computer system 10 are communicatively coupled via a first Local Area Network (LAN) 6. Consequently, all of the computing devices 1, 2, 3 are able to access the local server 4 via the first LAN 6 and use the functionalities of the MFD 5 via the LAN 6.

The first LAN 6 of the first computer system 10 is connected to the Internet 20, which in turn provides computing devices 1, 2, 3 with access to a multitude of other computing devices, including a server 30 and a second computer system 40. The second computer system 40 also includes two computing devices 41, 42, connected by a second LAN 43.

In this exemplary embodiment of the cyber security appliance 100, a first computing device 1 on the first computer system 10 has the electronic hardware, modules, models, and various software processes of the cyber security appliance 100; and therefore, runs threat detection for detecting threats to the first computer system 10. As such, the first computing device 1 includes one or more processors arranged to run the steps of the process described herein, memory storage components required to store information related to the running of the process, as well as one or more network interfaces for collecting information from various security controls (e.g., sensors, probes, etc.) collecting data associated with the system (network) 50 under analysis.

The cyber security appliance 100 in the first computing device 1 builds and maintains a dynamic, ever-changing model of the 'normal behavior' of each user and machine within the first computer system 10. The approach is based on Bayesian mathematics, and monitors all interactions, events and communications within the first computer system 10—which computing device is talking to which, files that have been created, networks that are being accessed.

For example, a second computing device 2 is based in a company's San Francisco office and operated by a marketing employee who regularly accesses the marketing network, usually communicates with machines in the company's U.K. office in the second computer system 40 between 9.30 AM and midday, and is active from about 8:30 AM until 6 PM.

The same employee virtually never accesses the employee time sheets, very rarely connects to the company's Atlanta network and has no dealings in South-East Asia. The cyber security appliance 100 takes all the information that is available relating to this employee and establishes a 'pattern of life' for that person and the devices used by that person in that system, which is dynamically updated as more information is gathered. The model of the normal pattern of life for an entity in the system 50 under analysis is used as a moving benchmark, allowing the cyber security appliance 100 to spot behavior on the system 50 seems to fall outside of this normal pattern of life, and flags this behavior as anomalous, requiring further investigation and/or autonomous action.

The cyber security appliance 100 is built to deal with the fact that today's attackers are getting stealthier, and an attacker/malicious agent may be 'hiding' in a system to ensure that they avoid raising suspicion in an end user, such as by slowing their machine down. The AI model(s) 160 in the cyber security appliance 100 builds a sophisticated 'pattern of life'—that understands what represents normality for every person, device, and network activity in the system being protected by the cyber security appliance 100.

The self-learning algorithms in the AI can, for example, understand each node's (user account, device, etc.) in an organization's normal patterns of life in about a week, and grows more bespoke with every passing minute. Conventional AI typically relies solely on identifying threats based on historical attack data and reported techniques, requiring data to be cleansed, labelled, and moved to a centralized repository. The detection engine self-learning AI can learn "on the job" from real-world data occurring in the system and constantly evolves its understanding as the system's environment changes. The Artificial Intelligence can use machine learning algorithms to analyze patterns and 'learn' what is the 'normal behavior' of the system (network) 50 by analyzing data on the activity on the system 50 at the device and employee level. The unsupervised machine learning does not need humans to supervise the learning in the model but rather discovers hidden patterns or data groupings without the need for human intervention. The unsupervised machine learning discovers the patterns and related information using the unlabeled data monitored in the system itself. Unsupervised learning algorithms can include clustering, anomaly detection, neural networks, etc. Unsupervised Learning can break down features of what it is analyzing (e.g., a network node of a device or user account), which can be useful for categorization, and then identify what else has similar or overlapping feature sets matching to what it is analyzing.

The cyber security appliance 100 can use unsupervised machine learning to works things out without pre-defined labels. In the case of sorting a series of different entities, such as different devices, the system analyzes the information and works out the different classes of devices. This allows the system 50 to handle the unexpected and embrace uncertainty when new entities and classes are examined. The modules and models of the cyber security appliance 100 do not always know what they are looking for but can independently classify data and detect compelling patterns.

The cyber security appliance 100's unsupervised machine learning methods do not require training data with pre-defined labels. Instead, they are able to identify key patterns and trends in the data, without the need for human input. The advantage of unsupervised learning in this system is that it allows computers to go beyond what their programmers already know and discover previously unknown relationships. The unsupervised machine learning methods can use a probabilistic approach based on a Bayesian framework. The machine learning allows the cyber security appliance 100 to integrate a huge number of weak indicators/low threat values by themselves of potentially anomalous network behavior to produce a single clear overall measure of these correlated anomalies to determine how likely a network device is to be compromised. This probabilistic mathematical approach provides an ability to understand important information, amid the noise of the network—even when it does not know what it is looking for.

The cyber security appliance 100 can use a Recursive Bayesian Estimation to combine these multiple analyzes of different measures of network behavior to generate a single overall/comprehensive picture of the state of each device, the cyber security appliance 100 takes advantage of the power of Recursive Bayesian Estimation (RBE) via an implementation of the Bayes filter.

Using RBE, the cyber security appliance 100's AI models are able to constantly adapt themselves, in a computationally efficient manner, as new information becomes available to the system. The AI model(s) of The cyber security appliance 100 may be configured to continually recalculate threat levels in the light of new evidence, identifying changing attack behaviors where conventional signature-based methods fall down.

Training an AI model can be accomplished by having the model learn good values for all of the weights and the bias for labeled examples created by the system, and in this case; starting with no labels initially. A goal of the training of the AI model can be to find a set of weights and biases that have low loss, on average, across all examples.

The AI classifier can receive supervised machine learning with a labeled data set to learn to perform their task as discussed herein. An anomaly detection technique that can be used is supervised anomaly detection that requires a data set that has been labeled as "normal" and "abnormal" and involves training a classifier. Another anomaly detection technique that can be used is an unsupervised anomaly detection that detects anomalies in an unlabeled test data set under the assumption that the majority of the instances in the data set are normal, by looking for instances that seem to fit least to the remainder of the data set. The AI model representing normal behavior from a given normal training data set can detect anomalies by establishing the normal pattern and then test the likelihood of a test instance under analysis to be generated by the AI model. Anomaly detection can identify rare items, events or observations which raise suspicions by differing significantly from the majority of the data, which includes rare objects as well as things like unexpected bursts in activity.

The method and system are arranged to be performed by one or more processing components with any portions of software stored in an executable format on a computer readable medium. Thus, any portions of the method, apparatus and system implemented as software can be stored in one or more non-transitory memory storage devices in an executable format to be executed by one or more processors. The computer readable medium may be non-transitory and does not include radio or other carrier waves. The computer readable medium could be, for example, a physical computer readable medium such as semiconductor memory or solid-state memory, magnetic tape, a removable computer diskette, a random-access memory (RAM), a read-only memory (ROM), a rigid magnetic disc, and an optical disk, such as a CD-ROM, CD-R/W or DVD.

The various methods described above may also be implemented by a computer program product. The computer program product may include computer code arranged to instruct a computer to perform the functions of one or more of the various methods described above. The computer program and/or the code for performing such methods may be provided to an apparatus, such as a computer, on a computer readable medium or computer program product.

For the computer program product, a transitory computer readable medium may include radio or other carrier waves.

A computing system can be, wholly or partially, part of one or more of the server or client computing devices in accordance with some embodiments. Components of the computing system can include, but are not limited to, a processing unit having one or more processing cores, a system memory, and a system bus that couples various system components including the system memory to the processing unit.

Computing Devices

FIG. 12 illustrates a block diagram of an embodiment of one or more computing devices 1200 that can be a part of an AI-based, cyber security system including the cyber security appliance 100, the restoration engine, the prediction engine, etc. for an embodiment of the current design discussed herein.

The computing device may include one or more processors or processing units 1220 to execute instructions, one or more memories 1230-1232 to store information (including a basic input/output system (BIOS) 1233, operating system 1234, application programs 1235, other software 1236, program data 1237), one or more data input components 1260-1263 to receive data input from a user of the computing device 1200, one or more modules that include the management module, a network interface communication circuit 1270 to establish a communication link to communicate with other computing devices external to the computing device, one or more sensors where an output from the sensors is used for sensing a specific triggering condition and then correspondingly generating one or more preprogrammed actions, a display screen 1291 to display at least some of the information stored in the one or more memories 1230-1232 and other components. Note, portions of this design implemented in software 1244, 1245, 1246 are stored in the one or more memories 1230-1232 and are executed by the one or more processors 1220. The processing unit 1220 may have one or more processing cores, which couples to a system bus 1221 that couples various system components including the system memory 1230. The system bus 1221 may be any of several types of bus structures selected from a memory bus, an interconnect fabric, a peripheral bus, and a local bus using any of a variety of bus architectures.

Computing device 1200 typically includes a variety of computing machine-readable media. Non-transitory Machine-readable media can be any available media that can be accessed by computing device 1202 and includes both volatile and nonvolatile media, and removable and non-removable media (e.g., non-removable non-volatile memory interface 1240 and removable non-volatile memory interface 1250). By way of example, and not limitation, non-transitory machine-readable media use includes storage of information, such as computer-readable instructions, data structures, other executable software, or other data. Non-transitory machine-readable media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other tangible medium which can be used to store the desired information, and which can be accessed by the computing device 1202. Transitory media such as wireless channels are not included in the machine-readable media. Machine-readable media typically embody computer readable instructions, data structures, and other executable software. In an example, a volatile memory drive 1241 is illustrated for storing portions of the operating system 1244, application programs 1245, other executable software 1246, and program data 1247.

A user may enter commands and information into the computing device 1200 through input devices such as a keyboard, touchscreen, or software or hardware input buttons 1262, a microphone 1263, a pointing device and/or scrolling input component, such as a mouse, trackball or touch pad 1261. The microphone 1263 can cooperate with speech recognition software. These and other input devices are often connected to the processing unit 1220 through a user input interface 1260 that is coupled to the system bus 1221, but can be connected by other interface and bus structures, such as a lighting port, game port, or a universal serial bus (USB) 1251. A display monitor 1291 or other type of display screen device is also connected to the system bus 1221 via an interface, such as a display interface 1290. In addition to the monitor 1291, computing devices may also include other peripheral output devices such as speakers 1297, a vibration device 1299, and other output devices, which may be connected through an output peripheral interface 1295.

The computing device 1200 can operate in a networked environment using logical connections to one or more remote computers/client devices, such as a remote computing system 1280. The remote computing system 1280 can a personal computer, a mobile computing device, a server, a router, a network PC, a peer device or other common network node, and typically includes many or all of the elements described above relative to the computing device 1202. The logical connections can include a personal area network (PAN) 1272 (e.g., Bluetooth®), a local area network (LAN) 1271 (e.g., Wi-Fi), and a wide area network (WAN) 1273 (e.g., cellular network). Such networking environments are commonplace in offices, enterprise-wide computer networks, intranets and the Internet. A browser application and/or one or more local apps may be resident on the computing device and stored in the memory.

When used in a LAN networking environment, the computing device 1200 is connected to the LAN 1271 through a network interface 1270, which can be, for example, a Bluetooth® or Wi-Fi adapter. When used in a WAN networking environment (e.g., Internet), the computing device 1202 typically includes some means for establishing communications over the WAN 1273. With respect to mobile telecommunication technologies, for example, a radio interface, which can be internal or external, can be connected to the system bus 1221 via the network interface 1270, or other appropriate mechanism. In a networked environment, other software depicted relative to the computing device 1202, or portions thereof, may be stored in the remote memory storage device. By way of example, and not limitation, remote application programs 1285 as reside on remote computing device 1280. It will be appreciated that the network connections shown are examples and other means of establishing a communications link between the computing devices that may be used. It should be noted that the present design can be carried out on a single computing device or on a distributed system in which different portions of the present design are carried out on different parts of the distributed computing system.

In certain situations, each of the terms "engine," "module" and "component" is representative of hardware, firmware, and/or software that is configured to perform one or more functions. As hardware, the engine (or module or component) may include circuitry having data processing and/or storage functionality. Examples of such circuitry may include, but are not limited or restricted to a processor, a programmable gate array, a microcontroller, an application specific integrated circuit, wireless receiver, transmitter and/or transceiver circuitry, semiconductor memory, or combinatorial logic. Alternatively, or in combination with the hardware circuitry described above, the engine (or module or component) may be software in the form of one or more software modules, which may be configured to operate as its counterpart circuitry. For instance, a software module may be a software instance that operates as or is executed by a processor, namely a virtual processor whose underlying operations is based on a physical processor such as virtual processor instances for Microsoft® Azure® or Google® Cloud Services platform or an EC2 instance within the Amazon® AWS infrastructure, for example. Illustrative examples of the software module may include an executable application, a daemon application, an application programming interface (API), a subroutine, a function, a procedure, an applet, a servlet, a routine, source code, a shared library/dynamic load library, or simply one or more instructions. A module may be implemented in hardware electronic components, software components, and a combination of both. A module is a core component of a complex system consisting of hardware and/or software that is capable of performing its function discretely from other portions of the entire complex system but designed to interact with the other portions of the entire complex system. The term "computerized" generally represents that any corresponding operations are conducted by hardware in combination with software and/or firmware. The terms "computing device" or "device" should be generally construed as physical device with data processing capability, data storage capability, and/or a capability of connecting to any type of network, such as a public cloud network, a private cloud network, or any other network type. Examples of a computing device may include, but are not limited or restricted to, the following: a server, a router or other intermediary communication device, an endpoint (e.g., a laptop, a smartphone, a tablet, a desktop computer, a netbook, IoT device, networked wearable, etc.)

The term coupled is defined as meaning connected either directly to the component or indirectly to the component through another component.

The terms "or" and "and/or" as used herein are to be interpreted as inclusive or meaning any one or any combination. As an example, "A, B or C" or "A, B and/or C" mean "any of the following: A; B; C; A and B; A and C; B and C; A, B and C." An exception to this definition will occur only when a combination of elements, functions, steps or acts are in some way inherently mutually exclusive.

Unless explicitly stated otherwise, articles such as "a" or "an" should generally be interpreted to include one or more of the described items. Accordingly, phrases including but not limited to "a module," "a memory," "a processor." or "an AI model" are intended to include one or more of the recited items (i.e., one or more modules, one or more memories, one or more processors, or one or more AI models, respectively). Such one or more recited items can also be collectively configured to carry out (e.g., implement) the stated recitations. For example, "a processor (which may be configured) to carry out recitations A, B, and C" can include a first processor configured to carry out recitation A, in conjunction with a second processor configured to carry out recitations B and/or C, and in some cases, in further conjunction with a third processor to carry out recitation C, and so on.

Note, an application described herein includes but is not limited to software applications, mobile applications, and programs routines, objects, widgets, plug-ins that are part of an operating system application. Some portions of this description are presented in terms of algorithms and symbolic representations of operations on data bits within a computer memory. These algorithmic descriptions and representations are the means used by those skilled in the data processing arts to convey the substance of their work most effectively to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like. These algorithms can be written in a number of different software programming languages such as Python, C, C++, Java, HTTP, or other similar languages. Also, an algorithm can be implemented with lines of code in software, configured logic gates in hardware, or a combination of both. In an embodiment, the logic consists of electronic circuits that follow the rules of Boolean Logic, software that contain patterns of instructions, or any combination of both. Note, many functions performed by electronic hardware components can be duplicated by software emulation. Thus, a software program written to accomplish those same functions can emulate the functionality of the hardware components in the electronic circuitry.

Unless specifically stated otherwise as apparent from the above discussions, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers, or other such information storage, transmission or display devices.

While the foregoing design and embodiments thereof have been provided in considerable detail, it is not the intention of the applicant(s) for the design and embodiments provided herein to be limiting. Additional adaptations and/or modifications are possible, and, in broader aspects, these adaptations and/or modifications are also encompassed. Accordingly, departures may be made from the foregoing design and embodiments without departing from the scope afforded by the following claims, which scope is only limited by the claims when appropriately construed.

The invention claimed is:

1. An apparatus to protect a network from a potential cyber threat associated with a new endpoint to that network, the apparatus comprising: a memory to store a representation of an artificial intelligence (AI) model, where the AI model is at least partly trained based on information aggregated from a first information source and a second information source, where the first information source comprises information about a first factor that at least partly characterizes endpoints, and where the second information source comprises information about a second, different, factor that at least partly characterizes endpoints; and a processor to: receive information about the new endpoint to that network; determine, using the AI model, whether the information about the new endpoint indicates that a characteristic of the new endpoint overlaps with a profile of characteristics associated with endpoints known to be associated with a cyber threat by identifying that a metric defining a distance between a factor value representative of the characteristic of the new endpoint and a corresponding factor value of endpoints known to be associated with the cyber threat is within a specified range indicative of characteristic overlap; and in response to determining that the characteristic of the new endpoint overlaps with the profile of characteristics, instruct an action to be taken to protect the network from the cyber threat.

2. The apparatus of claim 1, wherein factors that at least partly characterize endpoints comprise one or more of:

an identifier of the new endpoint;

geographic region of the new endpoint;

age of the new endpoint;

where the new endpoint is registered;

content accessible at the new endpoint;

an activity time associated with the new endpoint;

a number of connections associated with the new endpoint;

an identity of one or more nodes that have communicated with the new endpoint; and metadata associated with the new endpoint.

3. The apparatus of claim 2, wherein the information about the new endpoint includes a factor value corresponding to a factor that at least partly characterizes endpoints including the new endpoint.

4. The apparatus of claim 1, wherein the information aggregated from the first information source and the second information source is derived from one or more of: publicly available information; privately held information; a database comprising information about malicious endpoints; a database comprising information about safe endpoints; a database comprising information about emails sent by malicious entities; a database comprising information about emails sent by safe entities; or data provided by a fleet of cyber security appliances.

5. An apparatus to protect a network from a potential cyber threat associated with a new endpoint to that network, the apparatus comprising: a memory to store a representation of an artificial intelligence (AI) model, wherein the AI model is trained to detect a property associated with the new endpoint, where the property is masked in the information about the new endpoint; and a processor to: receive information about the new endpoint to that network; determine using the AI model, whether the information about the new endpoint indicates that a characteristic of the new endpoint overlaps with a profile of characteristics associated with endpoints known to be associated with a cyber threat; and in response to determining that the characteristic of the new endpoint overlaps with the profile of characteristics, instruct an action to be taken to protect the network from the cyber threat.

6. The apparatus of claim 5, wherein the property is one of:

an identifier of the new endpoint that is masked by being represented by a different identifier;

an embedding in a message that is masked from being detected by a recipient of the message; and a service associated with the new endpoint.

7. The apparatus of claim 5, wherein the AI model is at least partly trained based on Masked-Language Modeling (MLM).

8. An apparatus, to protect a network from a potential cyber threat associated with a new endpoint to that network, the apparatus comprising: a memory to store a representation of an artificial intelligence (AI) model, wherein the AI model is trained to detect an indication that a command and control server is associated with the new endpoint, where the AI model is at least partly trained based on information indicative of a behavior profile of command and control servers; and a processor to: receive information about the new endpoint to that network; determine using the AI model, whether the information about the new endpoint indicates that a characteristic of the new endpoint overlaps with a profile of characteristics associated with endpoints known to be associated with a cyber threat; and in response to determining that the characteristic of the new endpoint overlaps with the profile of characteristics, instruct an action to be taken to protect the network from the cyber threat.

9. The apparatus of claim 8, wherein the information indicative of the behavior profile of command and control servers comprises one or more of:

information derived from a certificate associated with a known command and control server;

a metric indicative of a pattern of responses from different services;

a fingerprint indicative of a known command and control server;

a handshake indicative of a known command and control server;

information about registered domains; and information associated with communications with a known command and control server.

10. The apparatus of claim 1, wherein the aggregated information comprises a metric that at least partly characterizes a known endpoint.

11. The apparatus of claim 10, wherein the metric is derived from data associated with an activity of the known endpoint, where the data is obtained by a plurality of detectors, and where the metric is a combined metric based on a combination of a plurality of metrics determined by the plurality of detectors that has been weighted according to a relevance of the metric determined by each detector.

12. The apparatus of claim 11, wherein the combined metric is based on a distribution indicative of how many detectors of the plurality of detectors have determined that the metric associated with the detector falls within one of a set of intervals that represent a range of metric values, and where a weighting function is applied to the metric value associated with each interval based on how many detectors fall within the interval.

13. The apparatus of claim 11, wherein the data associated with the activity of the known endpoint is indicative of:

a popularity of communications with the known endpoint or a node associated with the known endpoint; or a rarity of communications with the known endpoint or a node associated with the known endpoint.

14. The apparatus of claim 1, wherein the processor is to receive the information about the new endpoint, and in response, determine whether information about the new endpoint indicates that the characteristic of the new endpoint overlaps with the profile of characteristics.

15. The apparatus of claim 1, wherein the apparatus is a cyber security appliance.

16. The apparatus of claim 1, wherein one or more of the first information source and the second information source belongs to a fleet of cyber security appliances.

17. A non-transitory computer readable medium storing instructions readable and executable by a processor to:

determine, using an artificial intelligence (AI) model, whether information about a new endpoint to a network indicates that a characteristic of the new endpoint overlaps with a profile of characteristics associated with endpoints known to be associated with a cyber threat by identifying that a metric defining a distance between a factor value representative of the characteristic of the new endpoint and a corresponding factor value of endpoints known to be associated with the cyber threat is within a specified range indicative of characteristic overlap, where the AI model is at least partly trained based on information aggregated from a first information source and a second information source, where the first information source comprises information about a first factor that at least partly characterizes endpoints, and where the second information source comprises information about a second, different, factor that at least partly characterizes endpoints; and in response to determining that the characteristic of the new endpoint overlaps with the profile of characteristics, instruct an action to be taken to protect the network from the cyber threat.

18. A computer-implemented method of protecting a network from a potential cyber threat associated with a new endpoint to the network, the method comprising:

determining, using an artificial intelligence (AI) model, whether information about the new endpoint indicates that a characteristic of the new endpoint overlaps with a profile of characteristics associated with endpoints known to be associated with a cyber threat by identifying that a metric defining a distance between a factor value representative of the characteristic of the new endpoint and a corresponding factor value of endpoints known to be associated with the cyber threat is within a specified range indicative of characteristic overlap, where the AI model is at least partly trained based on information aggregated from a first information source and a second information source, where the first information source comprises information about a first factor that at least partly characterizes endpoints, and where the second information source comprises information about a second, different, factor that at least partly characterizes endpoints; and in response to determining that the characteristic of the new endpoint overlaps with the profile of characteristics, instructing an action to be taken to protect the network from the cyber threat.

19. The computer-implemented method of claim 18, wherein the AI model is trained to detect an indication that a command and control server is associated with the new endpoint, where the AI model is at least partly trained based on information indicative of a behavior profile of command and control servers.

20. A non-transitory computer readable medium storing instructions readable and executable by a processor to:

determine, using an artificial intelligence (AI) model, whether information about a new endpoint to a network indicates that a characteristic of the new endpoint overlaps with a profile of characteristics associated with endpoints known to be associated with a cyber threat, where the AI model is trained to detect an indication that a command and control server is associated with the new endpoint, where the AI model is at least partly trained based on information indicative of a behavior profile of command and control servers; and in response to determining that the characteristic of the new endpoint overlaps with the profile of characteristics, instruct an action to be taken to protect the network from the cyber threat.

* * * * *